United States Patent
Troy et al.

(10) Patent No.: US 12,371,193 B2
(45) Date of Patent: Jul. 29, 2025

(54) METHODS FOR MARKING SURFACES USING UNMANNED AERIAL VEHICLES

(71) Applicant: The Boeing Company, Arlington, VA (US)

(72) Inventors: James J. Troy, Issaquah, WA (US); Gary E. Georgeson, Tacoma, WA (US); Gregory J. Sweers, Renton, WA (US)

(73) Assignee: The Boeing Company, Arlington, VA (US)

( * ) Notice: Subject to any disclaimer, the term of this patent is extended or adjusted under 35 U.S.C. 154(b) by 169 days.

(21) Appl. No.: 18/223,383

(22) Filed: Jul. 18, 2023

(65) Prior Publication Data
US 2023/0356840 A1 Nov. 9, 2023

Related U.S. Application Data

(62) Division of application No. 16/907,056, filed on Jun. 19, 2020, now Pat. No. 11,745,872.

(51) Int. Cl.
*B64F 5/30* (2017.01)
*B64F 5/40* (2017.01)
(Continued)

(52) U.S. Cl.
CPC ............... *B64F 5/30* (2017.01); *B64F 5/40* (2017.01); *B64U 10/13* (2023.01); *B64D 1/18* (2013.01);
(Continued)

(58) Field of Classification Search
CPC ... B64F 5/30; B64F 5/40; B64U 10/13; B64U 2101/26; B64U 2101/29; B64D 1/18
See application file for complete search history.

(56) References Cited

U.S. PATENT DOCUMENTS 9,221,506 B1 * 12/2015 Georgeson ............... B25J 5/007
10,510,158 B1 * 12/2019 Kamon ..................... G06T 7/73
(Continued)

FOREIGN PATENT DOCUMENTS

| CA | 2979925 A1 * | 4/2018 | ........... B64C 39/024 |
| JP | 2004501790 A * | 1/2004 | ............. G05B 19/39 |
| WO | WO-2018208320 A1 * | 11/2018 | ............. B08B 3/024 |

OTHER PUBLICATIONS

Aris et al. ("Design and Development of a Programmable Painting Robot for Houses and Buildings") ( Year: 2005).*
(Continued)

*Primary Examiner* — Assres H Woldemaryam
(74) *Attorney, Agent, or Firm* — Joseph M. Butscher; The Small Patent Law Group, LLC

(57) ABSTRACT

Methods and apparatus for UAV-enabled marking of surfaces during manufacture, inspection, or repair of limited-access structures and objects. A UAV is equipped with a marking module that is configured to apply marking patterns (e.g., alignment features) of known dimensions to surfaces. The marking module may include a 2-D plotter that enables free-form drawing capability. The marking process may involve depositing material on the surface. The marking material may be either permanent or removable. A "clean-up" module may be attached to the UAV platform instead of the marking module, and may include solvents and oscillating or vibrating pads to remove the marks via scrubbing. The clean-up module can also be used for initial surface preparation.

20 Claims, 36 Drawing Sheets

(51) Int. Cl.
*B64U 10/13* (2023.01)
*B64D 1/18* (2006.01)
*B64U 101/26* (2023.01)
*B64U 101/29* (2023.01)

(52) U.S. Cl.
CPC ...... *B64U 2101/26* (2023.01); *B64U 2101/29* (2023.01)

(56) References Cited

U.S. PATENT DOCUMENTS

| | | | | |
|---|---|---|---|---|
| 11,662,728 | B2* | 5/2023 | Hafenrichter | F03D 17/00 73/660 |
| 2012/0103705 | A1* | 5/2012 | Schlee | B25J 5/007 180/14.1 |
| 2013/0024067 | A1* | 1/2013 | Troy | B64F 5/30 180/69.6 |
| 2015/0226369 | A1* | 8/2015 | Troy | F16M 11/18 901/1 |
| 2017/0050749 | A1* | 2/2017 | Pilskalns | B60L 53/14 |
| 2017/0072557 | A1* | 3/2017 | Troy | G06T 19/003 |
| 2018/0056670 | A1* | 3/2018 | Kerr | B05B 13/005 |
| 2019/0084670 | A1* | 3/2019 | Sharma | B64U 10/14 |
| 2019/0127052 | A1* | 5/2019 | Chen | B64C 25/12 |
| 2020/0057002 | A1* | 2/2020 | Jung | F03D 17/00 |
| 2020/0166938 | A1* | 5/2020 | Hafenrichter | G05D 1/0202 |
| 2020/0207488 | A1* | 7/2020 | Troy | G05D 1/0094 |
| 2022/0041281 | A1* | 2/2022 | Amsili | B64D 1/22 |

OTHER PUBLICATIONS

Vempati et al. ("PaintCopter: An Autonomous UAV for Spray Painting on 3D Surfaces") (Year: 2018).*

* cited by examiner

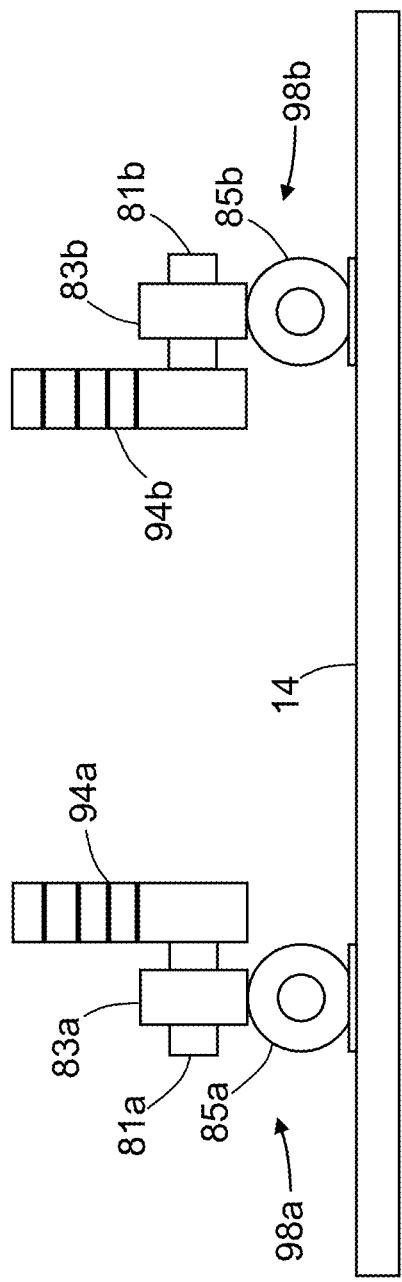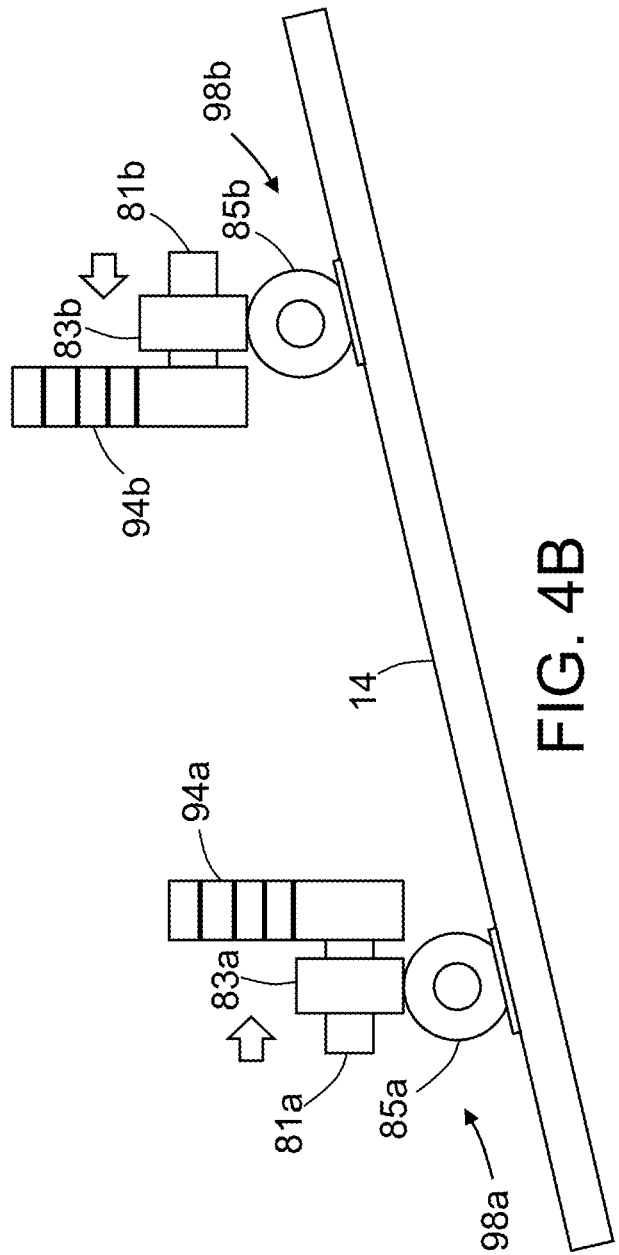

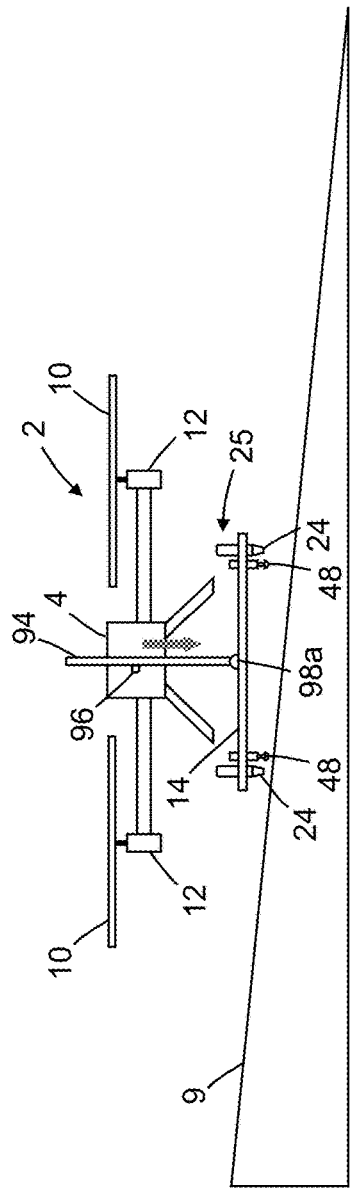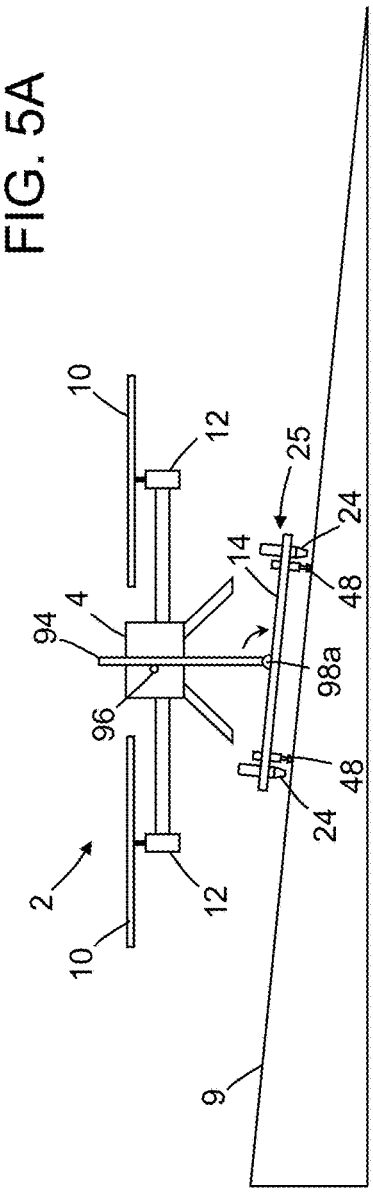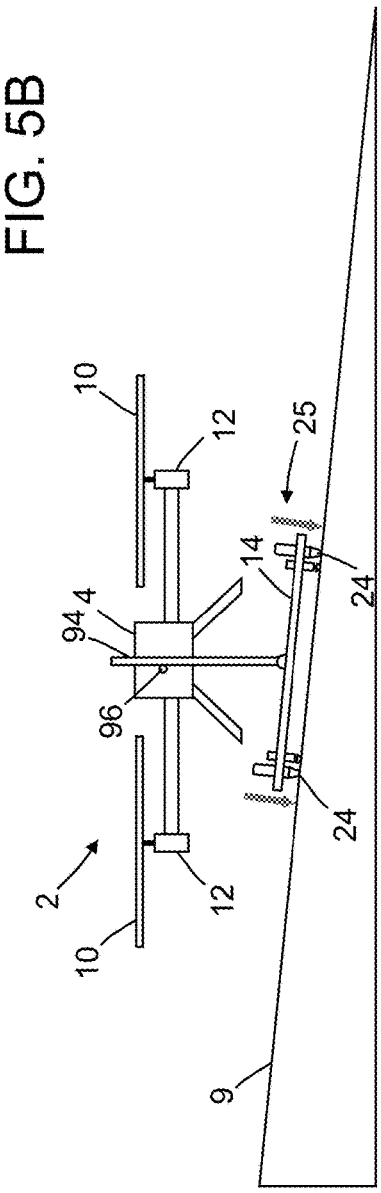

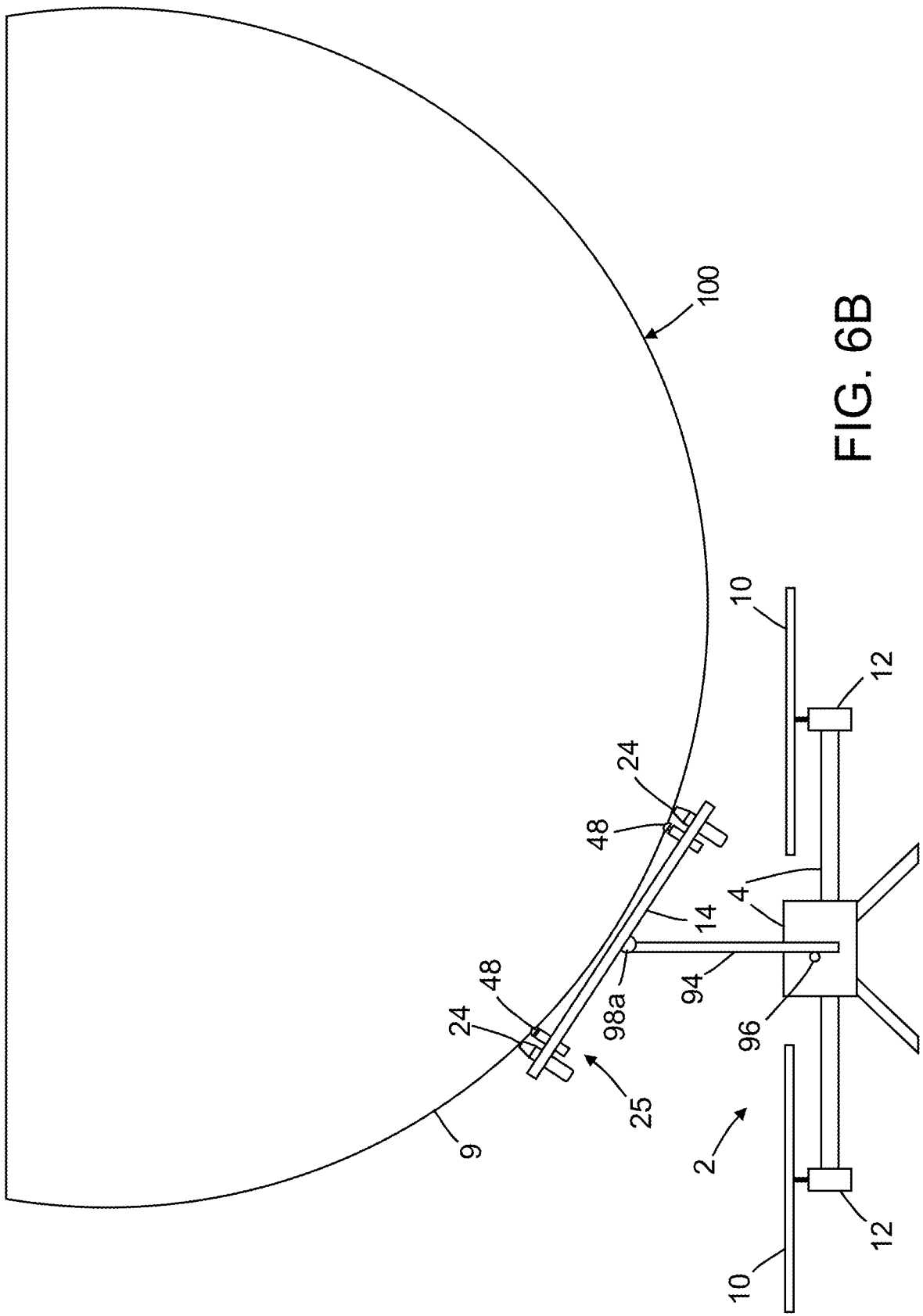

METHODS FOR MARKING SURFACES USING UNMANNED AERIAL VEHICLES

This application is a divisional of and claims domestic benefit from U.S. patent application Ser. No. 16/907,056 filed on Jun. 19, 2020, now U.S. Pat. No. 11,745,872.

BACKGROUND

The present disclosure relates generally to marking systems and, more particularly, to methods and systems for marking surfaces of large structures and objects which are difficult for personnel to access (hereinafter "limited-access structures and objects").

During manufacturing, inspection, or repair of a limited-access structure or object, the process may include marking the surface of the structure or object. For example, some processes require markings to provide relative location information for manufacturing, inspection, and repair applications. Without accurate reference information, those applications may not be able to operate as effectively.

The primary way that visible indicator marks are applied to a surface of a structure or object by a worker is by manual application, which may require a ladder, scaffolding, or scissor lifts. This can be dangerous and time consuming. In some remote situations, these solutions may not be available. Ground-based robotic vehicles capable of marking do exist, but ground-based robotic vehicles have limitations in the types of environments that they can service. Unmanned aerial vehicles (UAVs) have a much larger range and require less support equipment to operate than ground-based robotic marking systems. It would be desirable to provide a method for marking the surface of a limited-access structure or object using a UAV during manufacturing, inspection, or repair operations.

SUMMARY

The subject matter disclosed in some detail below is directed to methods and apparatus for UAV-enabled marking of surfaces during manufacture, inspection, or repair of limited-access structures and objects. In accordance with some embodiments, a UAV is equipped with a marking module that may be configured to apply marking patterns of known dimensions to surfaces of a structure or an object. For example, the marking patterns may include alignment features (e.g., a grid) for use in inspection, repair, or manufacturing processes. The modular marking unit proposed herein may be coupled to existing commercial-off-the-shelf UAVs. In accordance with some embodiments, the marking module includes a two-dimensional plotter device (hereinafter "2-D plotter") that enables free-form drawing capability.

More specifically, the marking module includes a module frame that is coupled (rotatably and/or releasably) to a body frame of the UAV. The marking module further includes at least one marking device supported by the module frame. In accordance with some embodiments, the marking module may be carried by the UAV to the target object, attached to the surface of the target object, and then uncoupled from the UAV, allowing the UAV to fly other missions while the marking module performs a marking task. In accordance with other embodiments, the module frame is pivotably coupled to the body frame of the UAV, which enables the module frame to adjust to different surface orientations as the marking module is placed in contact with a surface. In this case, the module frame is equipped with a plurality of compliant stabilizers which maintain the marking device in a suitable location relative to the surface to be marked.

In accordance with various embodiments, the marking process may involve depositing material on a surface or laser scoring the surface. For example, the marks may be made by depositing a visible material, such as ink, dye, or paint, using a pen-based element such as a permanent marker, a dry or a wet erase marker, or ink jet marking. The marking module may include a vibration actuator that is coupled to the marking device to enable consistent marking of the surface. In one proposed implementation, the visible material may also be detectable using an ultrasonic transducer array or an eddy current sensor. In accordance with other embodiments, permanent marks may be made by etching (e.g., using a laser).

The marking material may be either permanent or removable. In the latter case, a mark removal process is also described below. For cases in which the marks are removable, a "clean-up" module may be attached to the UAV platform instead of the marking module, and may include solvents and oscillating or vibrating pads to remove the marks via scrubbing when they are no longer needed. The clean-up module can also be used for initial surface preparation.

Although various embodiments of methods and apparatus for UAV-enabled marking of surfaces of limited-access structures and objects are described in some detail later herein, one or more of those embodiments may be characterized by one or more of the following aspects.

One aspect of the subject matter disclosed in detail below is an apparatus for marking a surface of a structure or object, the apparatus comprising: a first frame; a plurality of rotor motors mounted to the first frame and capable of producing lift greater than a weight of the apparatus; a plurality of rotors operatively coupled to respective rotor motors of the plurality of rotor motors; a controller programmed to control the rotor motors in a manner that produces lift greater than the weight of the apparatus; a linear actuator coupled to the first frame; a second frame pivotably coupled to the linear actuator; first and second compliant stabilizers supported by the second frame; and a marking device supported by the second frame. The first marking device and the first and second compliant stabilizers are arranged so that the first and second compliant stabilizers contact the target surface before the first marking device contacts the target surface as the second frame approaches the target surface.

In accordance with some embodiments of the apparatus described in the immediately preceding paragraph, the marking device comprises a contact tip that applies ink, dye or paint. Optionally, the apparatus further comprises a vibration actuator coupled to the first marking device. In another embodiment, the marking device is a laser.

Another aspect of the subject matter disclosed in detail below is an apparatus for marking a surface of a structure or object, the apparatus comprising: a first frame; a plurality of rotor motors mounted to the first frame and capable of producing lift greater than a weight of the apparatus; a plurality of rotors operatively coupled to respective rotor motors of the plurality of rotor motors; a first controller programmed to control the rotor motors in a manner that produces lift greater than the weight of the apparatus; an arm rotatably coupled to the first frame and having a distal end; a second frame coupled to the distal end of the arm; a 2-D plotter movably coupled to the second frame; a marking device supported by the 2-D plotter; and a second controller programmed to control the plotter so that the marking device follows a pre-defined motion path. In accordance with some embodiments, the second frame is releasably coupled to the first frame and the apparatus further comprises a plurality of surface attachment devices mounted to the second frame.

A further aspect of the subject matter disclosed in detail below is a method for marking a surface of a structure or object using an unmanned aerial vehicle, the method comprising: (a) coupling a marking module to an unmanned aerial vehicle; (b) flying the unmanned aerial vehicle to a location in proximity to the surface while carrying the marking module; (c) placing the marking module into contact with the surface; (d) marking the surface using a marking device of the marking module while the marking module is in contact with the surface; (e) coupling a clean-up module to an unmanned aerial vehicle; (f) flying the unmanned aerial vehicle to a location in proximity to the surface while carrying the clean-up module; (g) placing the clean-up module into contact with the surface; and (h) removing the marking from the surface using a cleaning element of the clean-up module while the clean-up module is in contact with the surface. For example, the cleaning element may be a scrubbing pad, cleaning wipe, or liquid spray.

Yet another aspect is a method for marking a surface of a structure or object using an unmanned aerial vehicle, the method comprising: (a) coupling a marking module to an unmanned aerial vehicle; (b) flying the unmanned aerial vehicle to a position where compliant stabilizers of the marking module contact the surface; (c) while the compliant stabilizers are in contact with the surface, displacing a module frame of the module toward the surface until a contact tip of the marking device contacts the surface; and (d) vibrating the marking device while the contact tip is in contact with the surface.

Other aspects of methods and apparatus for marking of surfaces of UAV-accessible structures and objects are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIGS. 4A and 4B are diagrams representing front views of a module frame 14 pivotably coupled to the ends of two racks of a rack-and-pinion system in a manner to allow the module frame to rotate about the roll axis without constraint due to the fixed distance between pivot points.

FIGS. 5A-5C are respective diagrams showing the marking module-carrying UAV depicted in FIG. 5 at three stages of a marking process in accordance with one embodiment.

FIG. 6B is a diagram representing a side view of a flying apparatus having a marking module carried above the UAV and deployed by upward movement.

Reference will hereinafter be made to the drawings in which similar elements in different drawings bear the same reference numerals.

DETAILED DESCRIPTION

Figure 1:
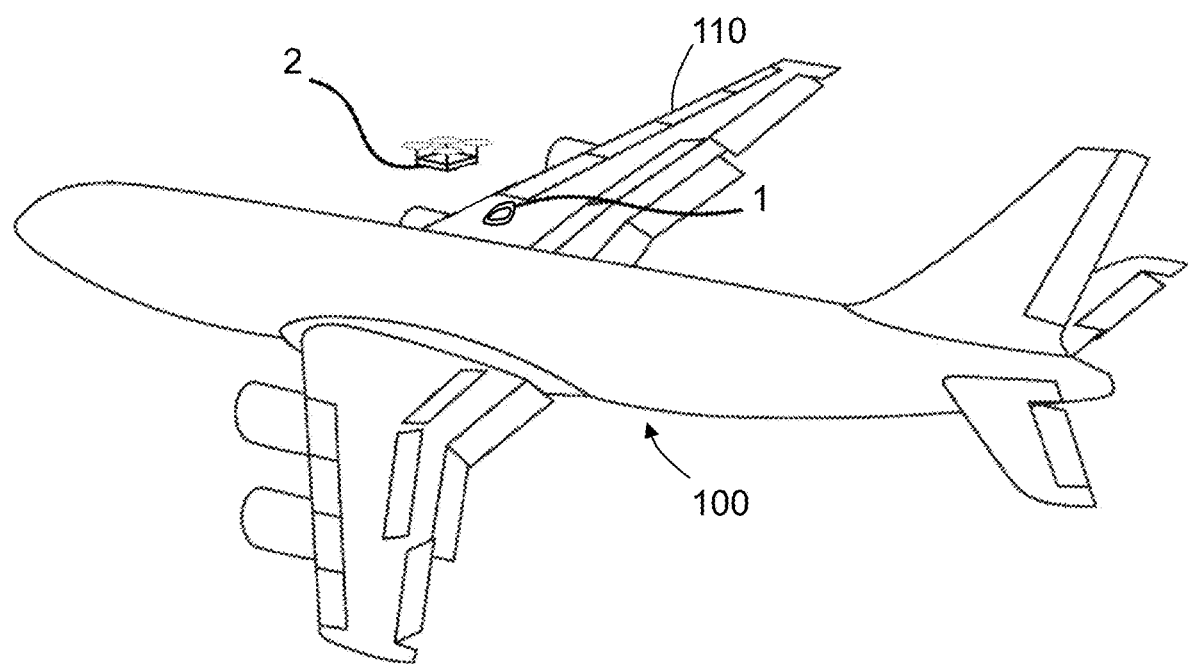
FIG. 1 is a diagram representing a three-dimensional view of a UAV flying in proximity to a target object in anticipation of executing a marking task.

For the purpose of illustration, methods and apparatus for marking of surfaces of UAV-accessible structures and objects will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The concepts disclosed herein may be reduced to practice using UAVs of a type that is capable of hovering near a surface to be marked. In accordance with the embodiments disclosed in some detail below, the UAV is a rotorcraft having multiple rotors. In some UAVs, each rotor has two mutually diametrically opposed rotor blades. However, in alternative implementations, UAVs having rotors with more than two rotor blades may be used. As used herein, the term "rotor" refers to a rotating device that includes a rotor mast, a rotor hub mounted to one end of the rotor mast, and two or more rotor blades extending radially outward from the rotor hub. In the embodiments disclosed herein, the rotor mast is mechanically coupled to an output shaft of a drive motor, referred to hereinafter as a "rotor motor". The rotor motor drives rotation of the rotor. As used herein, the term "rotor system" means a combination of components, including at least a plurality of rotors and a controller configured to control rotor rotation rate to generate sufficient aerodynamic lift force to support the weight of the UAV and sufficient thrust to counteract aerodynamic drag in forward flight. The UAVs disclosed herein further include a controller which preferably takes the form of a plurality of rotor motor controllers that communicate with an on-board computer configured to coordinate the respective rotations of rotors. The controller is configured (e.g., programmed) to control the rotors to cause the UAV to fly along a flight path to a location where the UAV (or a module carried by the UAV) is in proximity to or in contact with an area on the surface of a structure to be marked. (As used herein, the term "location" comprises position in a three-dimensional coordinate system and orientation relative to that coordinate system.)

During manufacturing, inspection, or repair of a limited-access structure or object, the involved processes may include marking the surface of the structure or object for various purposes. For example, some processes require markings to provide relative location reference information for manufacturing, inspection, and repair applications. This disclosure describes methods and apparatus involving UAV-enabled marking for such purposes.

FIG. 1 is a diagram representing a three-dimensional view of a UAV 2 flying in proximity to a target object 100 in anticipation of executing a marking task. In the example depicted in FIG. 1, the target object 100 is an aircraft. However, the target object 100 may be a ship, an engine, a satellite, a rocket, etc. In addition, a marker-equipped UAV may be used to mark structures such as buildings, bridges, towers, and wind turbines. In accordance with the exemplary scenario depicted in FIG. 1, the UAV 2 may be equipped with a marking module (not shown in FIG. 1) for marking an area of interest on the surface of an aircraft wing 110 of the aircraft. The area of interest may be an inspection area that may include an anomaly 1 (e.g., a dent or gouge). In accordance with the embodiments disclosed herein, the marking module includes a marking device for marking surfaces of UAV-accessible structures and objects.

In order to make a viable marking system that uses a UAV as the delivery platform, the marking system should be able to address a full range of orientations of the surface (horizontal, vertical, and angled), while not destabilizing the flight control of the UAV or interfering with the rotors. It should also be able to apply the markings to the surface without jitter. In accordance with the embodiments described below, the UAV 2 seen in FIG. 1 carries an end effector in the form of a marking module that includes one or more marking devices. In accordance with some embodiments, the marking module also includes a plurality of compliant stabilizers. In cases where the markings are not permanent, the marking module may be further equipped with devices for cleaning up the marks after the tasks have been completed.

In accordance with another embodiment of a UAV-enabled marking system, the UAV 2 may be equipped with a selected one of a plurality of interchangeable modules, such as a marking module and a clean-up module. In this case, the marking module is coupled to the UAV and then the marking module-equipped UAV flies to the marking site to perform a marking operation. Upon completion of the marking task, the UAV returns to its original location, where the marking module is removed and the clean-up module is installed. Then the clean-up module-equipped UAV flies to the marking site to perform a marking removal process. In some embodiments the marking module may contain clean-up elements in addition to marking elements, and may include on-board actuators to swap the configuration between marking and cleaning.

Figure 2:
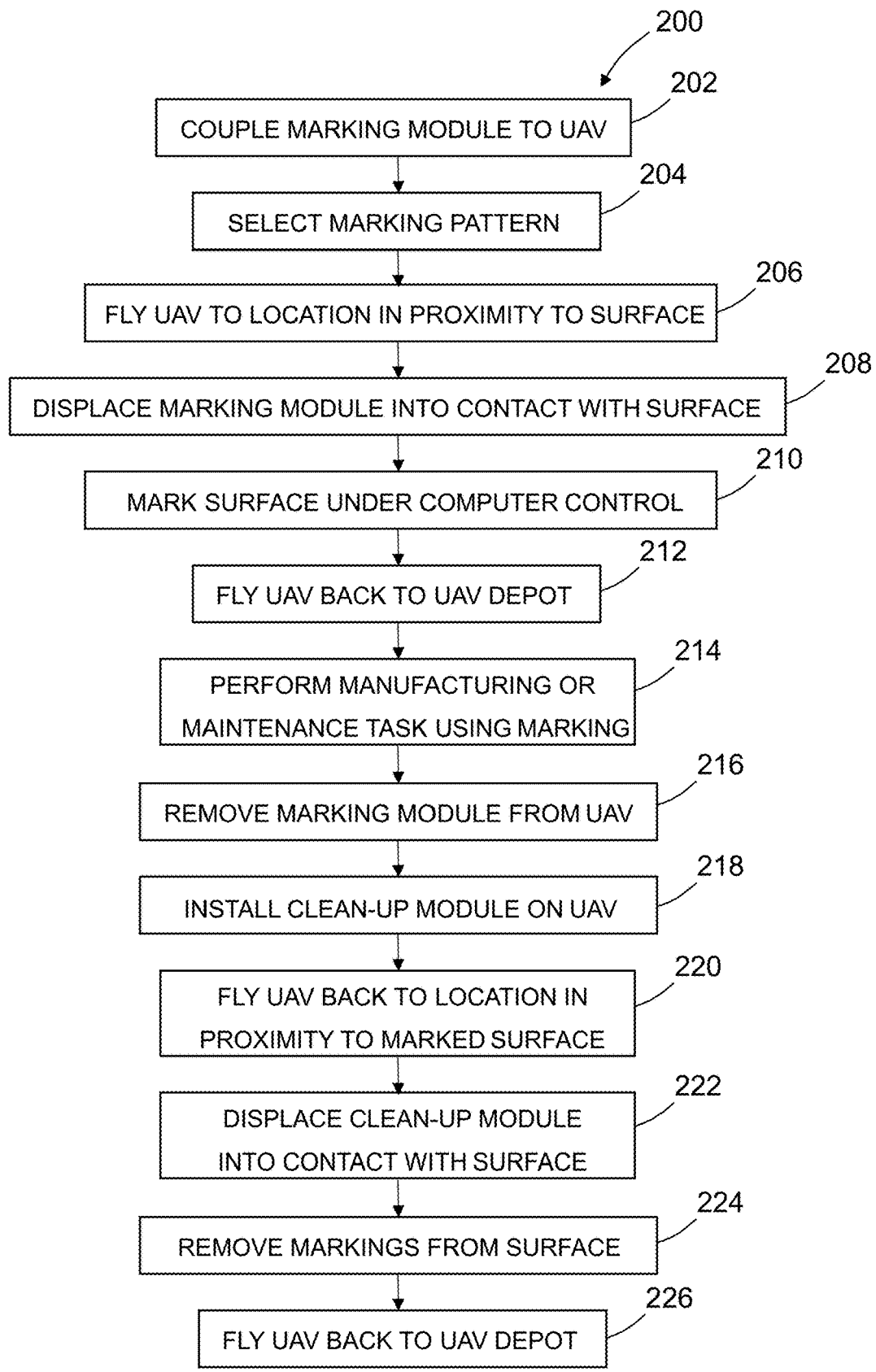
FIG. 2 is a flowchart identifying steps of a method for UAV-enabled marking of a surface of a limited-access structure or object in accordance with one embodiment.

FIG. 2 is a flowchart identifying steps of a method 200 for UAV-enabled marking of a surface of a limited-access structure or object in accordance with one embodiment. The method 200 starts by coupling a marking module to a UAV (step 202) and selecting a marking pattern (step 204). For example, the marking module controller may be programmed to control the marking process to achieve the selected pattern. To perform the marking task, the UAV flies to a location in proximity to the surface to be marked while carrying the marking module (step 206). Then the marking module is displaced into contact with the surface (step 208). While the marking module is in contact with the surface, the surface may be marked by computer control of the marking module (step 210). Then the UAV flies back to the UAV depot (step 212) and the manufacturing or maintenance task is performed using the marking module (step 214). Meanwhile, at the UAV depot the marking module is removed (step 216) and a clean-up module is installed (step 218). Then the UAV flies back to a location in proximity to the marked surface while carrying the clean-up module (step 220) and then displaces the clean-up module into contact with the surface (step 222). The markings are removed from the surface using a cleaning element, such as a scrubbing pad, of the clean-up module while the clean-up module is in contact with the surface (step 224). After the markings have been removed, the UAV flies back to the UAV depot (226).

Various embodiments of marking modules will be described in some detail below. The marking module carried by the UAV 2 seen in FIG. 1 may have one or more marking devices. In accordance with some embodiments, a plurality of fixed marking devices may be fixedly coupled to the marking module to form respective marks (e.g., dots) which are printed concurrently. In accordance with other embodiments, the marking module may be configured to move a single marking device in a manner that enables free-form line drawing capability. As used herein, the phrase "fixedly coupled to" as applied to two parts means that one of the parts is either affixed to or integrally formed with the other part. As used herein, the term "affixed" should be construed broadly to encompass all of the following types of fixation: welding, adhesive bonding, and fastening.

Figure 3A:
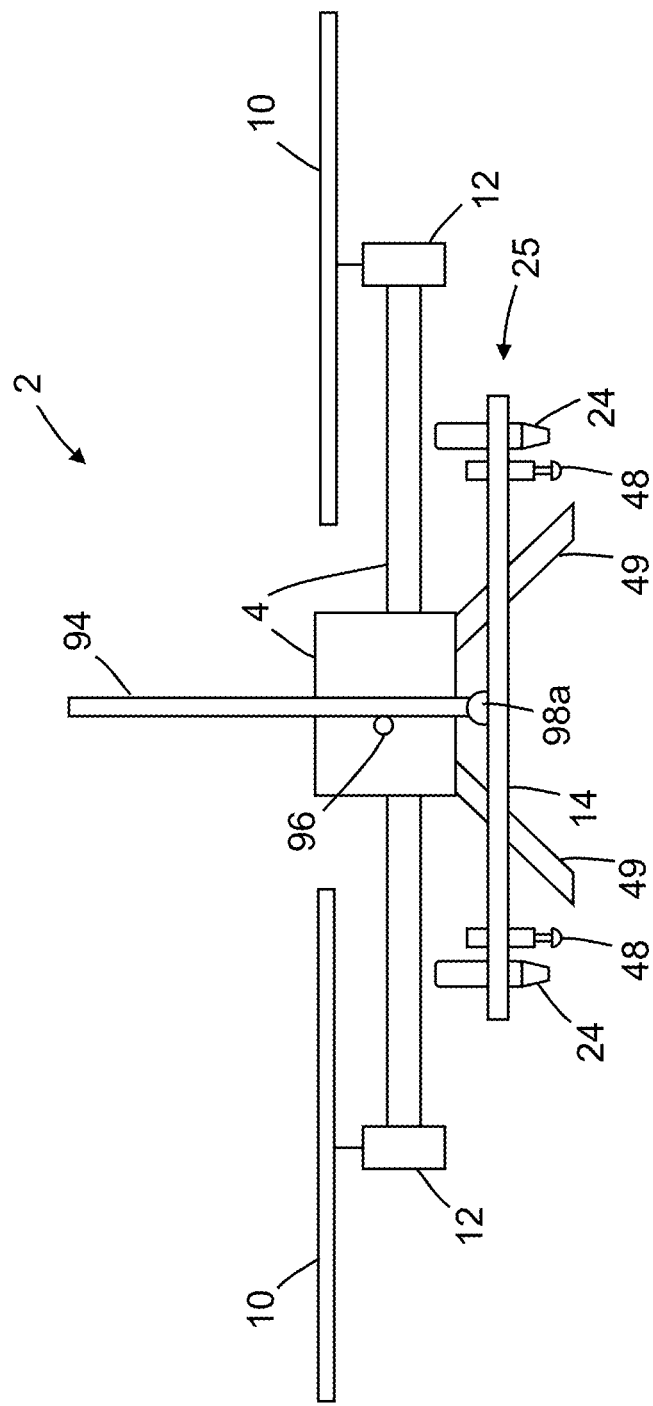
FIG. 3A is a diagram representing a side view of a marking module-carrying UAV in accordance with one embodiment in which the marking module is coupled to the ends of two racks of a rack-and-pinion system.

FIG. 3A is a diagram representing a side view of a marking module-carrying UAV 2 in accordance with one embodiment in which the marking module is pivotably coupled to the ends of two mutually parallel racks 94 (only one of which is visible in FIG. 3A) of a rack-and-pinion arrangement, each of which is coupled to a linear guide (not shown) to constrain the parallel racks 94 to vertical motion. Only one pivot joint 98a of a pair of pivot joints is visible in FIG. 3A. As seen in FIG. 3A, the UAV 2 includes a body frame 4, a plurality of (e.g., four) rotor motors 12 mounted to the body frame 4, and a plurality of (e.g., four) rotors respectively operatively coupled to the plurality of rotor motors 12. The body frame 4 includes the central body of the UAV 2 and the rotor support arms. Optionally, the UAV 2 may be equipped with one or more video cameras and lighting elements (neither of which are shown in FIG. 3A) to assist the remote operator to control the system and determine where to put the marks.

Figure 3B:
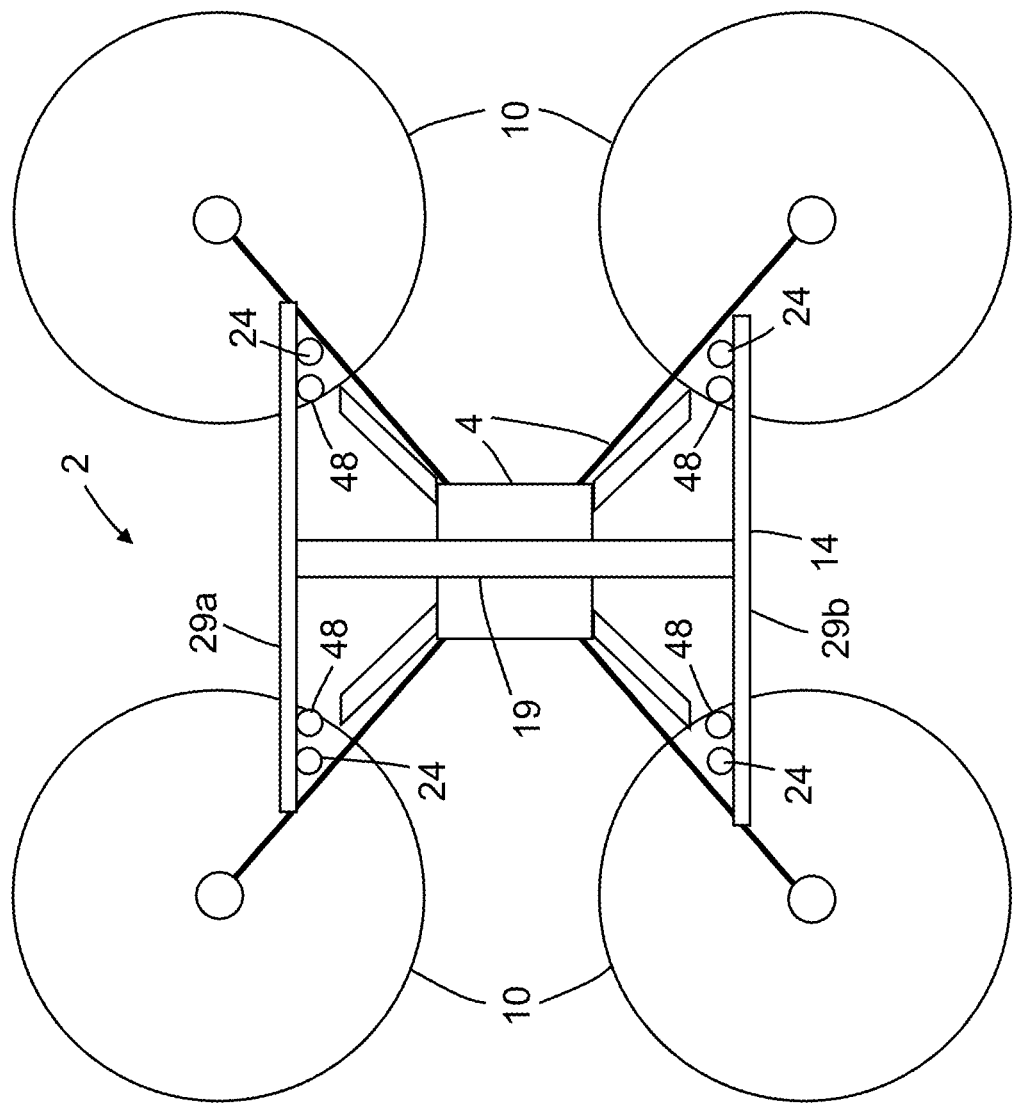
FIG. 3B is a diagram representing a bottom view of the UAV depicted in FIG. 3A.

FIG. 3B is a diagram representing a bottom view of the UAV 2 depicted in FIG. 3A. As seen in FIG. 3B, the marking module 25 includes a module frame 14 that supports a plurality of marking devices 24 and a plurality of compliant stabilizers 48. In the example depicted in FIG. 3B, there are four marking devices 24 and four compliant stabilizers 48. The four marking devices 24 may be positioned at the four vertices of a rectangle. During a marking operation, a surface may be marked by pressing the tips of the four marking devices 24 against the surface in unison.

Figure 3C:
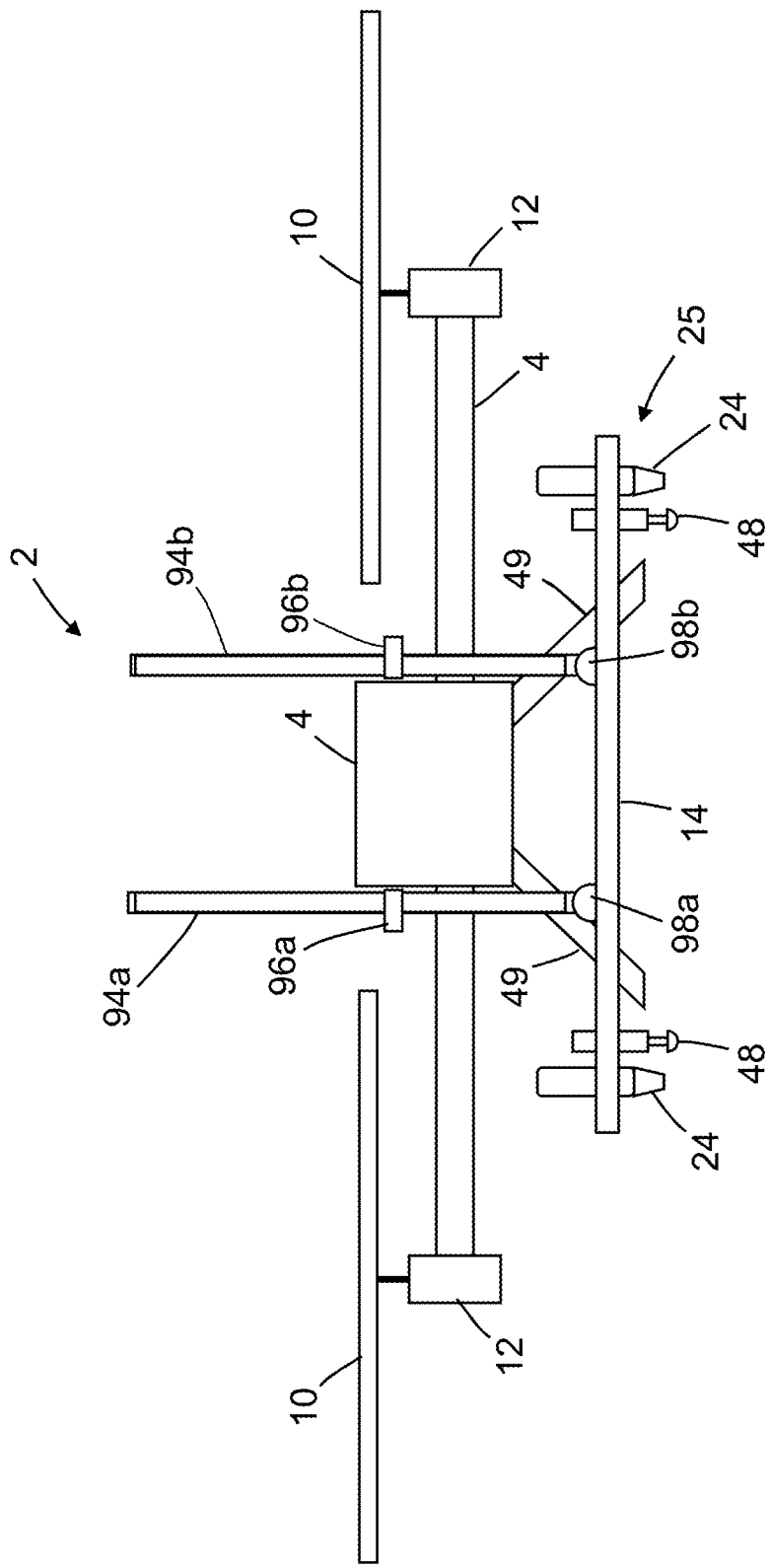
FIGS. 3C and 3D are diagrams representing front views of the UAV depicted in FIG. 3A. The marking module carried by the UAV is shown in two states: with a roll angle equal to zero (FIG. 3C) and with a non-zero roll angle (FIG. 3D).
Figure 3D:
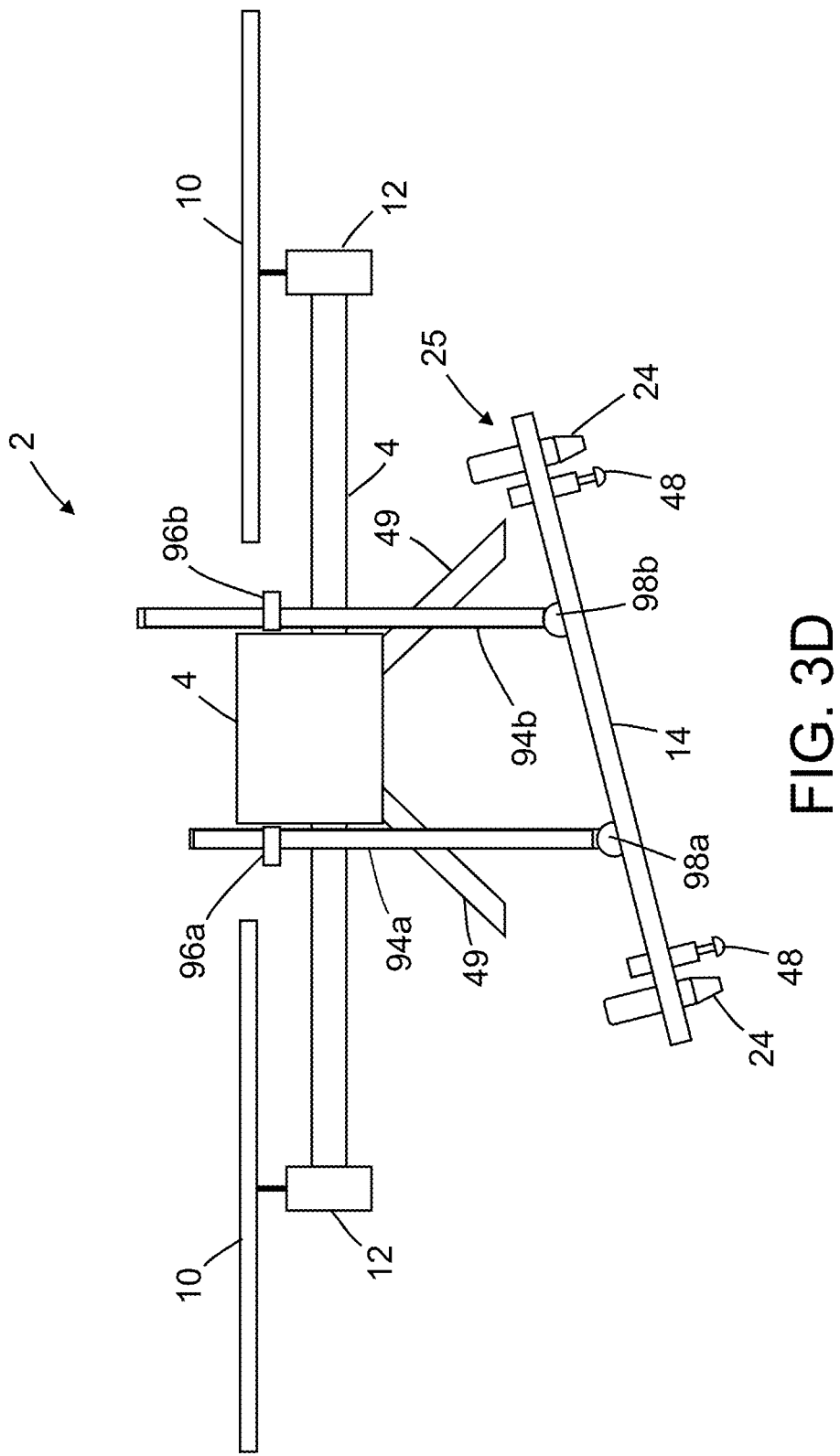

FIG. 3C is a diagram representing a front view of the UAV 2 depicted in FIG. 3A. The marking module 25 carried by the UAV 2 is shown with a roll angle of the marking module equal to zero in FIG. 3C. In contrast, FIG. 3D shows the marking module 25 oriented with a non-zero roll angle. The freedom to rotate about the roll axis enables the marking module 25 to adjust its orientation so that all compliant stabilizers 48 touch the surface during landing.

As seen in FIGS. 3C and 3D, the UAV 2 includes a pair of linear actuators in the form of respective rack-and-pinion combinations. One linear actuator includes a rack 94a which is driven to translate vertically relative to a horizontal body frame 4 by rotation of a pinion gear 96a. The other linear actuator includes a rack 94b which is driven to translate vertically relative to the body frame 4 by rotation of a pinion gear 96b. The racks 94a and 94b are mutually parallel, but are able to translate vertically independently. Each pinion gear 96a/96b is coupled to the output shaft of a respective pinion gear motor (not shown in FIGS. 3A-3D, but see pinion gear motors 95a and 95b in FIG. 9). Each rack 94a/94b is vertically translatable between retracted and extended positions as the associated pinion gears 96a and 96b rotate, which translation is facilitated by linear guides (not shown in FIGS. 3C and 3D). The pinion gears 96a and 96b are backdrivable so that the racks 94a and 94b are compliant when subjected to a force that opposes rack extension.

FIG. 3D shows a situation in which the racks 94a and 94b have been displaced downward different distances, which differential displacement causes the module frame 14 to rotate about the roll axis. The module frame 14 of the marking module 25 is pivotably coupled to the bottom ends of racks 94a and 94b by means of a pair of pivot joints 98a and 98b. The pivot joints 98a and 98b are "compliant" in the sense that they adjust their respective positions relative to racks 94a and 94b while allowing the module frame 14 to rotate about the roll and pitch axes.

As best seen in FIG. 3B, the module frame 14 includes a cross beam 19 that is coupled to the compliant pivot joints 98a and 98b. The module frame 14 further includes a first beam 29a extending in opposite directions from one end of cross beam 19 and a second beam 29b extending in opposite directions from the other end of cross beam 19. The marking devices 24 are respectively affixed near the distal ends of the beams 29a and 29b. In the example configuration depicted in FIG. 3B, the marking devices 24 are arranged at the four corners of a rectangle. In this configuration, marking devices 24 may be pressed against a surface to form four ink spots in a rectangular array on a surface. The compliant stabilizers 48 are respectively affixed to beams 29a and 29b near the marking devices 24. As seen in FIG. 3A, when the rack 94 is retracted, the tips of compliant stabilizers 48 are disposed at an elevation which is lower than the elevation of the tips of the marking devices 24.

FIG. 3A shows the marking module 25 in a retracted position wherein the tips of the compliant stabilizers 48 do not extend below the plane of the landing legs 49. FIG. 3C shows the marking module 25 in an extended position wherein the tips of the compliant stabilizers 48 extend below the plane of the landing legs 49 with a roll angle of the marking module equal to zero degrees. This location of the marking module 25 is achieved by displacing the racks 94a and 94b downward equal distances. FIG. 3D shows the marking module 25 in an extended position wherein the module frame 14 is disposed below the plane of landing legs 49 with a non-zero roll angle. This location of the marking module 25 is achieved by further displacing the racks 94a and 94b downward by unequal distances.

The pivot joints 98a and 98b may be designed to address two axes of rotation (roll and pitch) and a small amount of sideways translation during rotation of the marking module 25. For the two axes of rotation, having joints with axes of rotation at a right angle to each other will address the rotation problem. If one of the angles is small, it is sometimes possible to handle that with a flexible bushing mount (similar to how a car suspension bushing works). Bushings can also handle a small amount of translation as well, but if the translation is too great for the bushing to handle, then a translational element, such as a pin that can slide along the axis of rotation of the bushing, may be provided to address the change in roll angle of a line intersecting the respective roll axes of the pivot joints 98a and 98b, which have a fixed separation distance as the marking module 25 rotates.

FIGS. 4A and 4B are diagrams representing front views of a module frame 14 pivotably coupled by means of pivot joints 98a and 98b to the ends of racks 94a and 94b in a manner to allow the module frame 14 to rotate about the roll axis without constraint due to the fixed distance separating pivot joints 98a and 98b. The pivot joint 98a includes bearings 83a and 85a which have respective axes of rotation which are mutually orthogonal. Similarly, the pivot joint 98b includes bearings 83b and 85b which have respective axes of rotation which are mutually orthogonal.

Referring to FIG. 4A, one pin 81a is affixed to the end of rack 94a, while another pin 81b is affixed to the end of rack 94b. When the racks 94a and 94b are at the same elevation as depicted in FIG. 4A, the pins 81a and 81b are coaxial and project outwardly in opposite directions. In addition, one bearing 83a is slidably coupled to the pin 81a, while another bearing 83b is slidably coupled to the pin 81b. In other words, the pins 81a and 81b respectively slide through the centers of bearing 83a and 83b. In the state depicted in FIG. 4A, the bearings 83a and 83b are separated from racks 94a and 94b by respective nominal bearing separation distances.

FIG. 4B depicts a state of the UAV 2 after rack 94a has been displaced downward relative to rack 94b. During relative displacement, the module frame 14 is rotated to the non-zero roll angle depicted in FIG. 4B. Due to the slidable coupling of bearings 83a and 83b to pins 81a and 81b respectively, bearings 83a and 83b are able to adjust their respective positions relative to racks 94a and 94b. In the example depicted in FIG. 4B, the arrows indicate that bearings 83a and 83b move toward each other, i.e., toward respective racks 94a and 94b. This positional adjustability eliminates rotational constraints when the distance separating bearings 85a and 85b is fixed. In alternative embodiments, the pivot joints 98a and 98b may be flexibly coupled to module frame 14 using rubber bushings to provide compliance.

Figure 5:
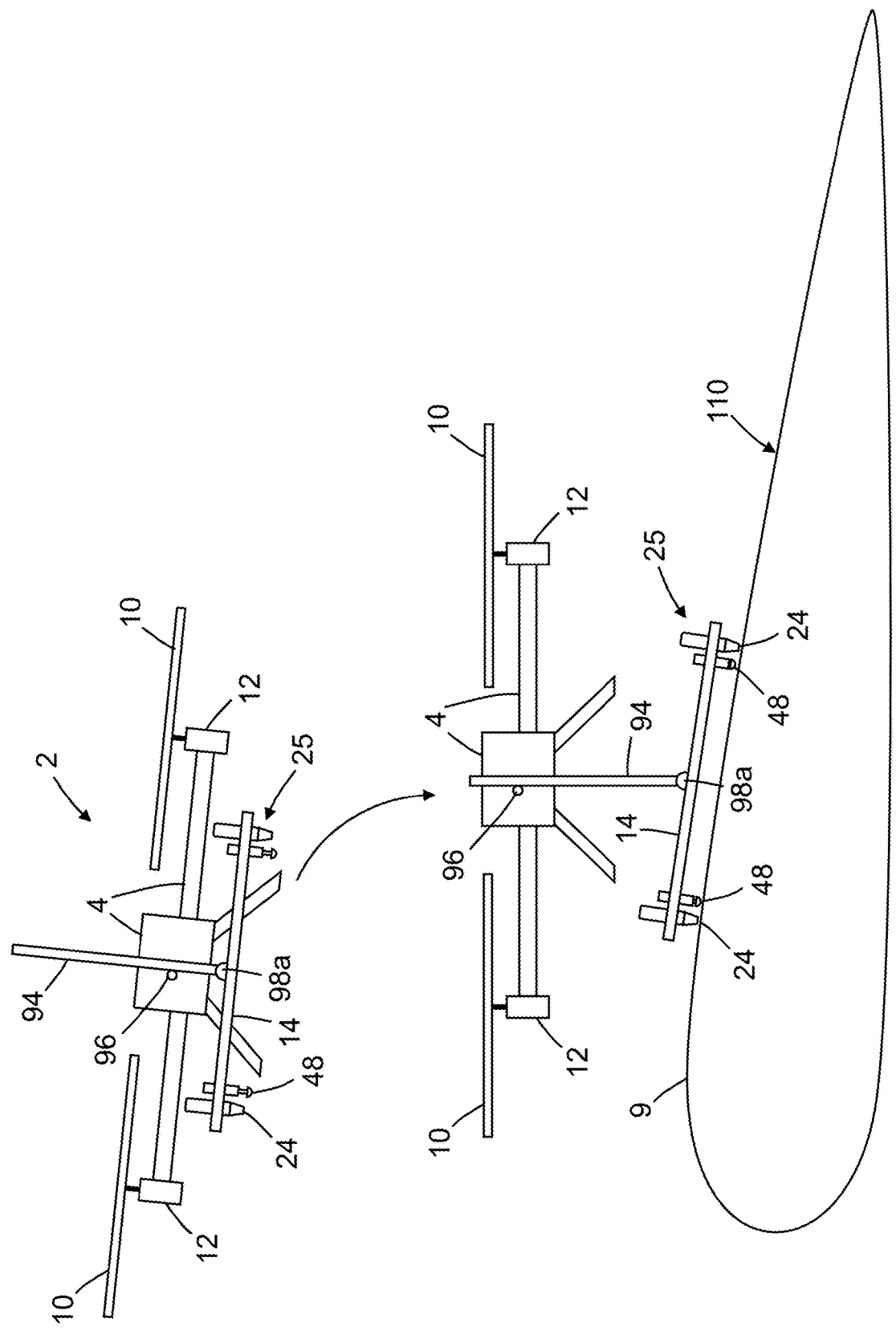
FIG. 5 is a diagram representing a side view showing the marking module-carrying UAV depicted in FIGS. 3A and 3B at two different instants in time: as the UAV flies toward (approaches) a surface and while the UAV hovers in proximity to the surface after landing the marking module on the surface.

FIG. 5 is a diagram representing a side view showing the apparatus at two different instants in time: (a) as the UAV 2 flies toward (approaches) a surface 9; and (b) when the UAV 2 is positioned to hover close enough to surface 9 that the marking operation may be performed. During the approach phase, the racks 94a and 94b are in respective fully retracted positions and the roll angle of module frame 14 equals zero. During the marking operation, the racks 94a and 94b are extended respective distances to cause module frame 14 to rotate (by contact with the surface) to an angular position that matches the orientation of surface 9. The compliant stabilizers 48 are designed to prevent lateral motion of the marking module 25 relative to the surface during marking. In accordance with one proposed implementation, each compliant stabilizer 48 may include a foot pad that contacts the surface 9. The foot pad may be made of an anti-skid material (such as rubber) or may be configured as a suction or electro-adhesion device.

The marking devices 24 may be pen-based elements such as permanent markers, dry and wet erase markers, or ink jet nozzles. In one proposed implementation, the marking devices 24 are pens of a type that apply marking material more efficiently when the pens are vibrated. In this case, the vibration actuators (not shown in FIG. 5, but see vibration actuators 33 in FIG. 9) may be connected to each marking device 24. The vibration actuators 33 are activated to cause the marking devices 24 to vibrate while in contact with surface 9, which vibration enables more consistent markings. For situations where the marks do not need to be removed, laser-based etching may be used.

In accordance with other embodiments, the marking material is detectable by some types of non-destructive inspection (NDI) scans. Having a marking material that can be detected by both NDI and visual means (photographs) can help with data alignment/correlation between the two types of data. For example, metallized inks or paint can be picked up by eddy current scanners, and materials with a different density than the scanned area, such as rubberized or plastic-based paints, can be detected by ultrasound scanners. Also, it may be useful in some situations to have more than one type of marker material onboard the marking system. This would allow the system to put down some marks that the NDI system can detect and others that are for visual detection—without having to switch out the material module.

FIGS. 5A-5C are respective diagrams representing a side view showing the marking module-carrying UAV 2 depicted in FIG. 4 at three stages of a marking process in accordance with one embodiment. The upper portion of FIG. 4 showed the UAV 2 in a state wherein the racks 94a and 94b are retracted. FIG. 5A shows the UAV 2 at a hovering position above the surface 9 as the racks 94a and 94b are extended (indicated by the downward-pointing arrow in FIG. 5A). During rack extension, the module frame 14 is lowered toward the surface 9. FIG. 5A shows the module frame 14 with the compliant stabilizers 48 fully extended, but not yet touching surface 9, although one of the compliant stabilizers 48 is nearly touching.

As the racks 94a and 94b continue to extend, one or two compliant stabilizers 48 come into contact with surface 9 and cease to descend, at which stage the pivot joints 98a and 98b continue to descend toward the surface 9. Due to the contact of compliant stabilizers 48 with surface 9, the module frame 14 rotates about the descending pivot joints

98a and 98b (as indicated by the curved arrow in FIG. 5B) until the tips of all compliant stabilizers 48 are in contact with surface 9, as depicted in FIG. 5B. The angle of surface 9 determines the roll angle of the module frame 14.

While the tips of all compliant stabilizers 48 are in contact with surface 9, the racks 94a and 94b continue to extend to cause the module frame 14 to descend. As will be described in more detail later with reference to FIG. 22, each compliant stabilizer 48 may comprise an outer tube 82 that is affixed to the module frame 14, a spring-loaded inner shaft 86 that translates between extended and retracted positions, and a contactor 88 affixed to a distal end of the inner shaft 86. The module frame 14 is moved downward with sufficient force to cause the compliant stabilizers 48 to retract until the contact tips of all marking devices 24 are in contact with surface 9, as depicted in FIG. 5C. At this stage, the vibration actuators (not shown in FIGS. 5A-5C) are activated to assist the marking devices 24 to make consistent marks on surface 9.

Figure 6A:
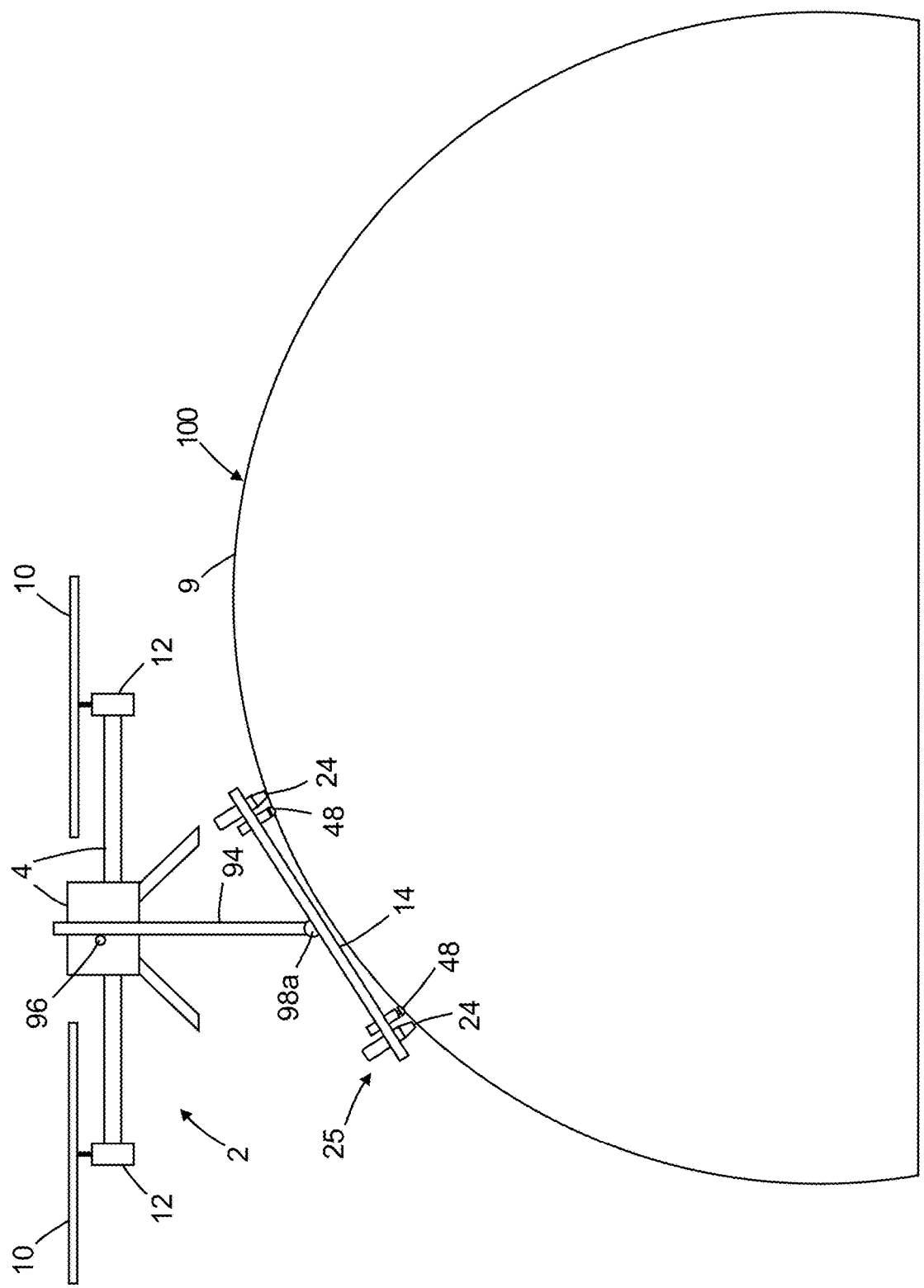
FIG. 6A is a diagram representing a side view of a flying apparatus having a marking module carried below the UAV and deployed by downward movement.

The technology proposed herein may be used to mark surfaces of limited-access objects such the aircraft seen in FIG. 1 or surfaces of limited-access structures such as storage tanks and wind turbines. FIG. 6A is a diagram representing a side view of a UAV 2 equipped with a marking module 25 that has been placed on a surface 9 of a target object 100. Only an upper portion of target object 100 is shown in FIG. 6A. Because the marking module 25 is disposed below the UAV 2, the UAV 2 may approach the surface 9 from above and then lower the marking module 25 into contact with the surface 9. The compliant stabilizers 48 are able to retract to the extent necessary to enable the tips of all marking devices 24 to contact the curved surface.

In an alternative configuration shown in FIG. 6B, the marking module 25 is disposed above rotors 10 of UAV 2, which enables UAV 2 to approach surface 9 of target object 100 from below and then raise marking module 25 into contact with surface 9. Only a lower portion of target object 100 is shown in FIG. 6B. Again, the compliant stabilizers 48 are able to retract to the extent necessary to enable the tips of all marking devices 24 to contact the curved surface.

Figure 7:
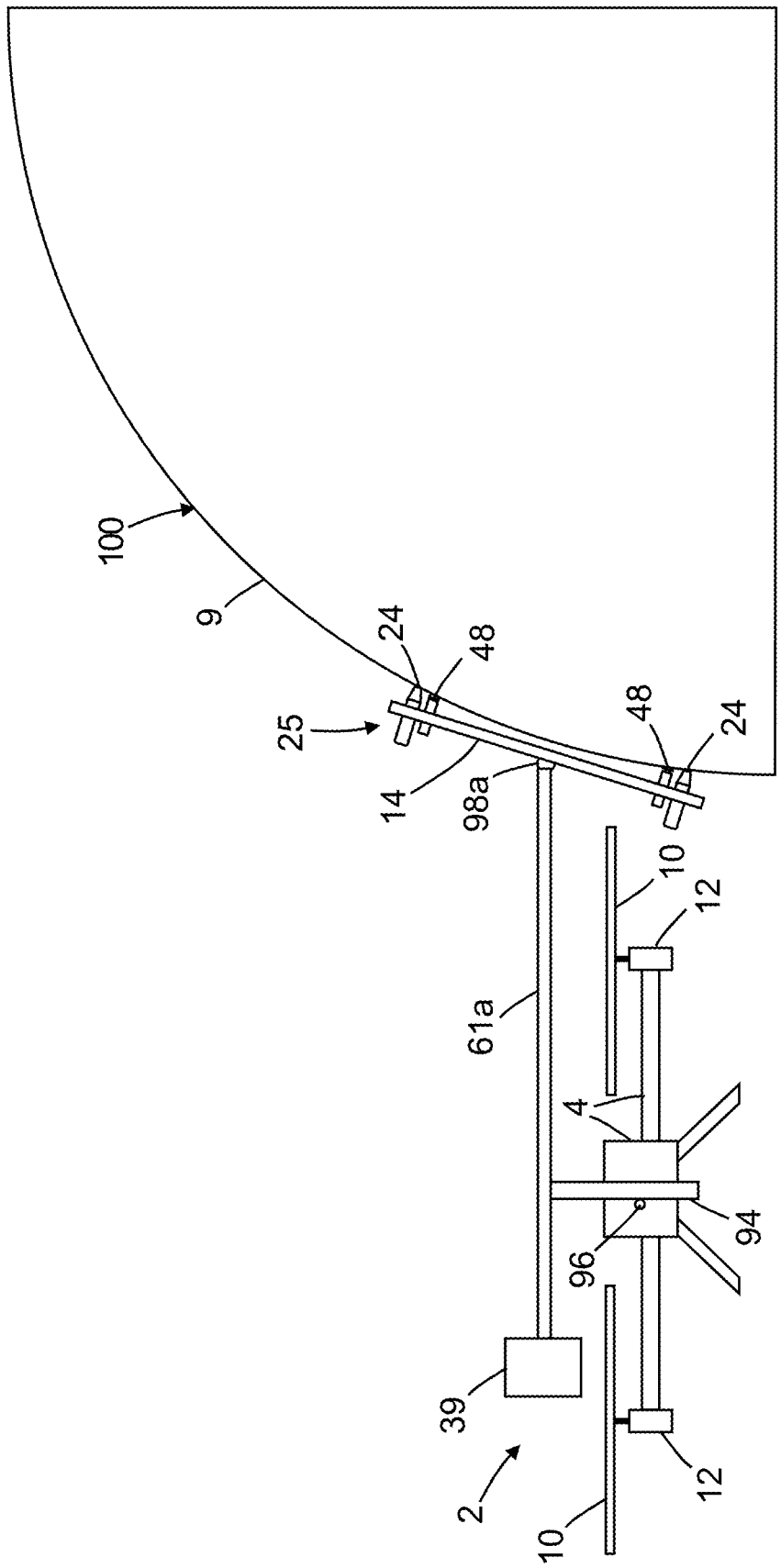
FIG. 7 is a diagram representing a side view of a marking module-carrying UAV in accordance with an alternate configuration in which a pair of horizontal extensions support a marking module with an orientation suitable for marking vertical and nearly vertical surfaces.

FIG. 7 is a diagram representing a side view of a marking module-carrying UAV 2 in accordance with an alternate configuration for marking vertical and nearly vertical surfaces. Instead of a pair of pivot joints 98 being coupled to the lower ends of a pair of racks 94 which, in turn, are coupled to body frame 4 by linear guides (not shown), the pivot joints 98a and 98b (only pivot joint 98a is visible in FIG. 7) are coupled to distal ends of a pair of horizontal extension arms 61a and 61b (only horizontal extension arm 61a is visible in FIG. 7; horizontal extension arm 61b is visible in FIG. 7A.) The marking module 25 is thus pivotably coupled to the ends of the horizontal extension arms 61a and 61b.

In the scenario depicted in FIG. 7, the UAV 2 may fly laterally from left to right until the marking module 25 lands on the surface 9 of a storage tank 12 (or other structure or object having a vertical or nearly vertical surface to be marked). The horizontal extension arms 61a and 61b have a length sufficient to ensure that the marking module 25 lands on the surface 9—thereby halting further lateral movement of the UAV 2—before rotors 10 have a chance to strike the surface 9. Intermediate portions of horizontal extension arms 61a and 61b are affixed to the upper ends of the racks 94. Thus, the horizontal extension arms 61a and 61b and rack 94 translate vertically in tandem. A counterweight 39 is attached to the other ends of horizontal extension arms 61 to balance the weight of the marking module 25.

Figure 7A:
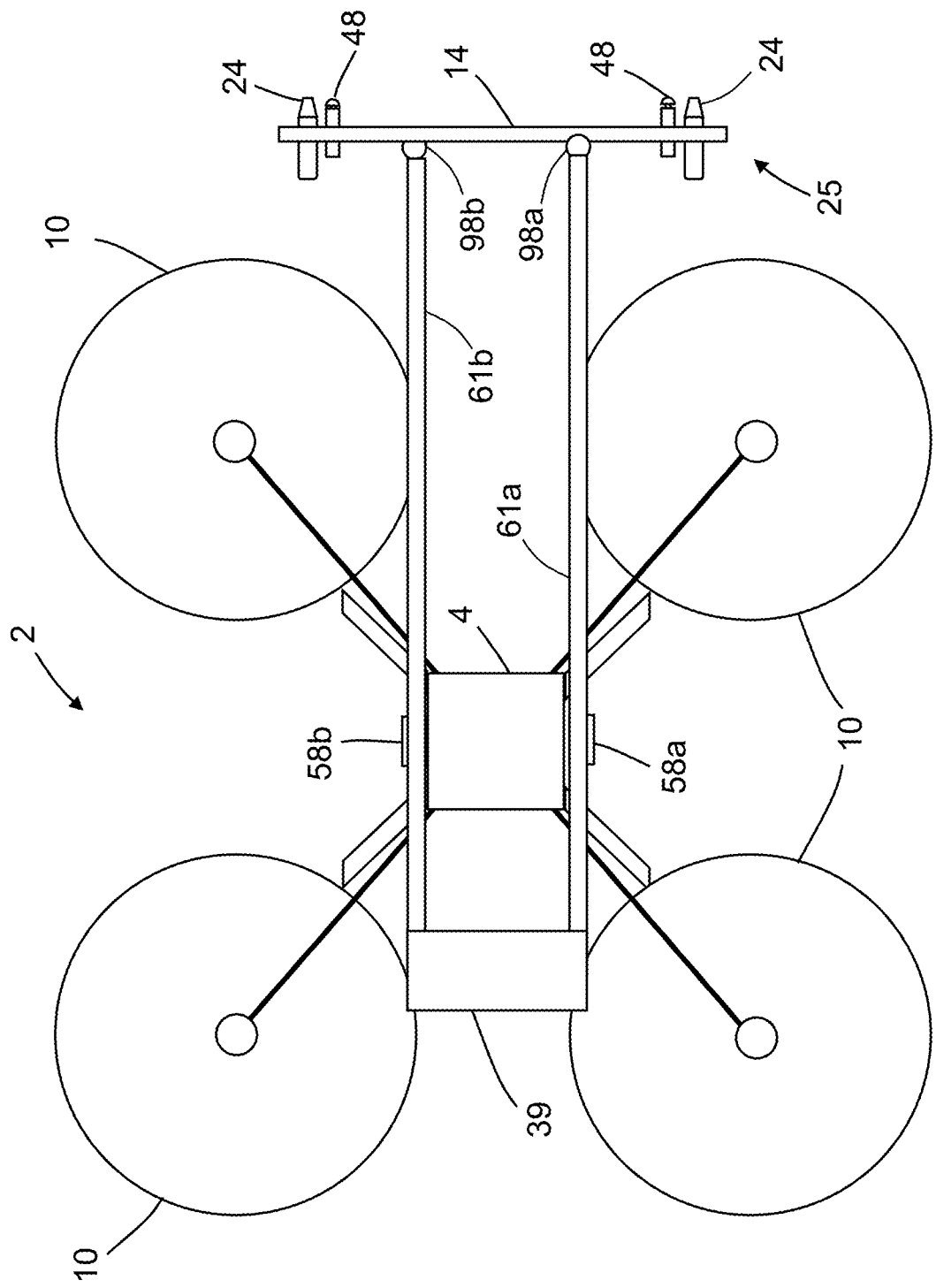
FIGS. 7A and 7B are diagrams representing top and front views respectively of the UAV depicted in FIG. 7.
Figure 7B:
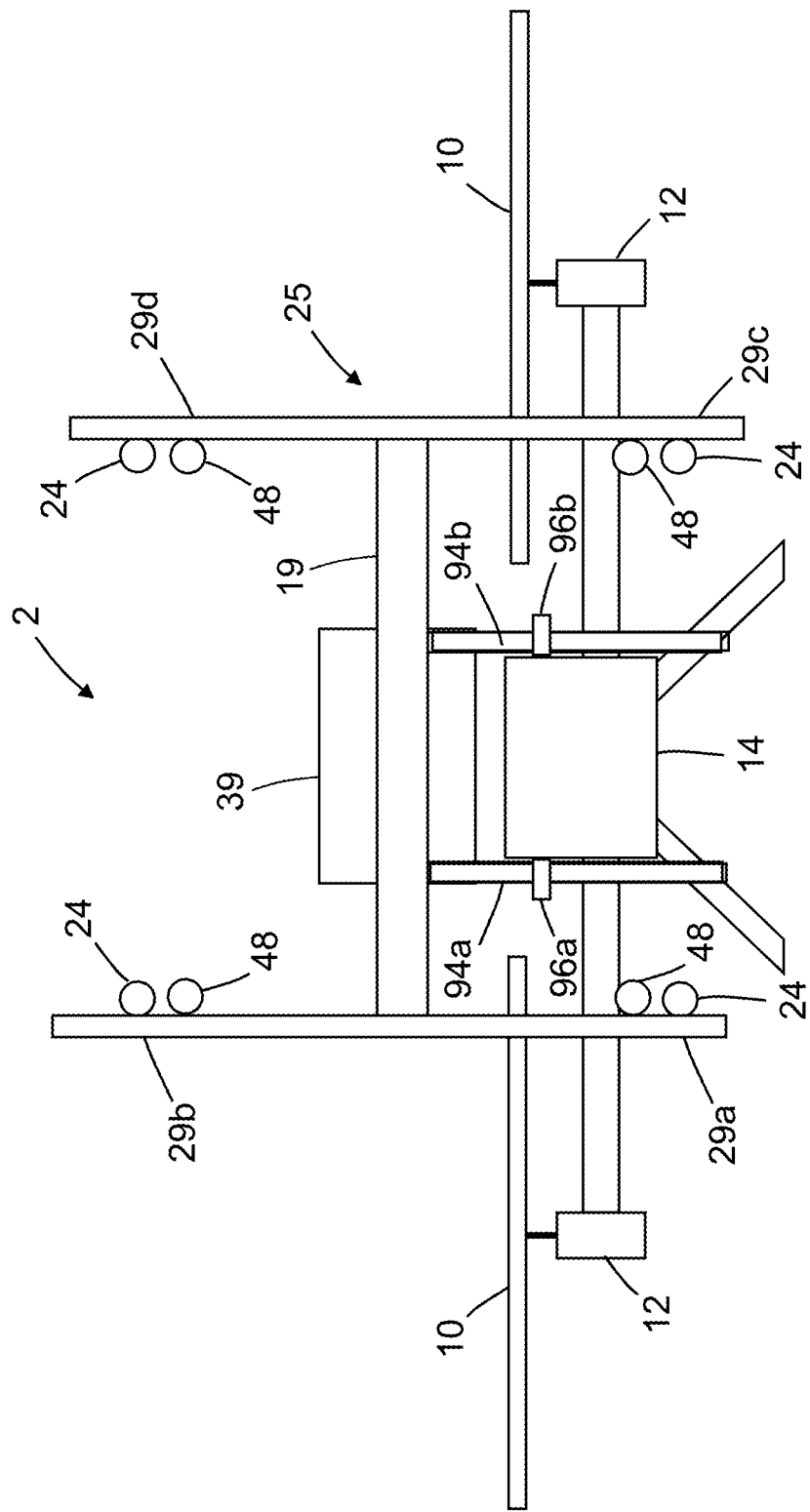

FIGS. 7A and 7B are diagrams representing top and front views respectively of the UAV 2 depicted in FIG. 7. As best seen in FIG. 7A, the module frame 14 is pivotably coupled to the distal ends of a pair of horizontal extension arms 61a and 61b by means of respective pivot joints 98a and 98b. The subassembly that includes counterweight 39, horizontal extension arms 61a and 61b, and marking module 25 is displaceable in the vertical direction during level UAV flight by means of the rack-and-pinion combinations seen in FIG. 7B. The racks 94a and 94b shown in FIG. 7B are attached to slidable linear guide halves of the linear guides 58a and 58b which are partly visible in FIG. 7A.

Figure 8:
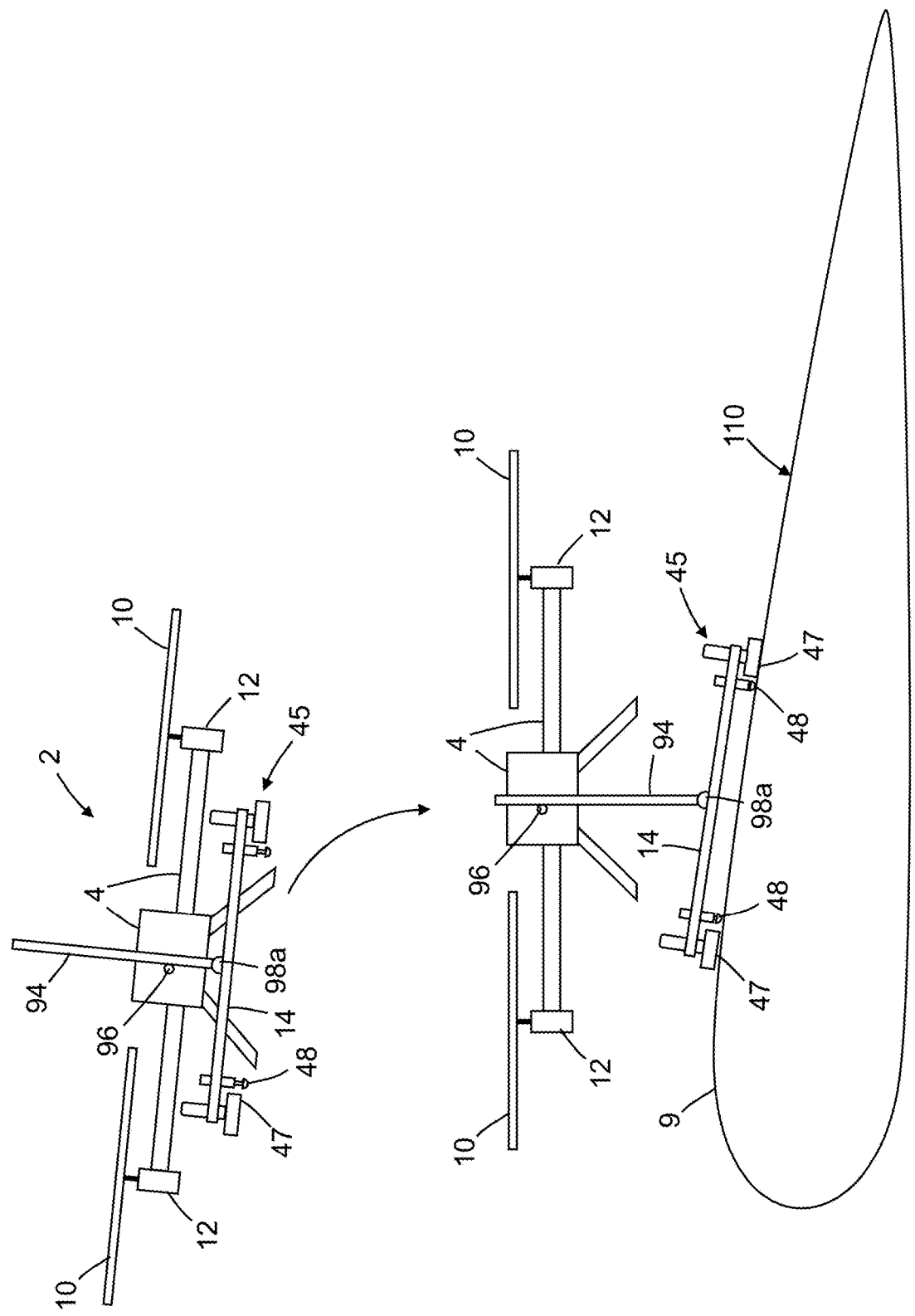
FIG. 8 is a diagram representing a side view showing a clean-up module-carrying UAV at two different instants in time: as the UAV flies toward (approaches) a surface and while the UAV hovers in proximity to the surface after landing the clean-up module on the surface.

As previously mentioned, a "clean-up" module may be attached to the UAV platform instead of the marking module, and may include solvents and oscillating or vibrating pads to remove the marks when they are no longer needed. The clean-up module can also be used for initial surface preparation. FIG. 8 is a diagram representing a side view showing a clean-up module-carrying UAV at two different instants in time: (a) as the UAV 2 flies toward (approaches) a surface 9; and (b) when the UAV 2 is hovering at a location close enough to surface 9 to enable removal of the markings by a clean-up module 45.

As seen in FIG. 8, the UAV 2 includes a body frame 4, a plurality of rotor motors 12 mounted to body frame 4, and a plurality of rotors 10 respectively operatively coupled to rotor motors 12, as previously described. Optionally, the UAV 2 may be equipped with one or more video cameras and lighting elements (not shown in FIG. 8) to assist the remote operator to control the system and determine the location of markings to be removed. In addition, UAV 2 depicted in FIG. 8 includes the same rack-and-pinion combinations already described in some detail with reference to FIG. 3C. The UAV 2 depicted in FIG. 8 carries a clean-up module 45 which is pivotably coupled to the ends of a pair of racks 94 by means of a pair of pivot joints 98 (only one of each pair is visible in FIG. 8). The clean-up module 45 translates vertically relative to body frame 4 of UAV 2 in tandem with racks 94.

The clean-up module 45 includes a module frame 14 that is coupled to pivot joints 98. In one example embodiment, the module frame 14 supports a plurality of scrubbing pads 47 and a plurality of compliant stabilizers 48. During the approach phase shown in the upper portion of FIG. 8, the racks 94 are retracted and the module frame 14 has a roll angle equal to zero. During the clean-up operation shown in the lower portion of FIG. 8, the racks 94 are extended and the module frame 14 is rotated to an angular position that matches the orientation of the marked surface to be cleaned.

Optionally, the clean-up module 45 further includes a respective vibration actuator (not shown in FIG. 8) connected to each scrubbing pad 47 (or other cleaning element) and a subsystem that includes a reservoir containing cleaning fluid and a spray nozzle for spraying that cleaning fluid onto the marked surface. First, the marked surface is wetted with cleaning fluid by spraying and then the vibration actuators are activated. The combination of cleaning fluid and vibratory scrubbing action enables the clean-up module 45 to remove surface marks (and dirt).

Figure 9:
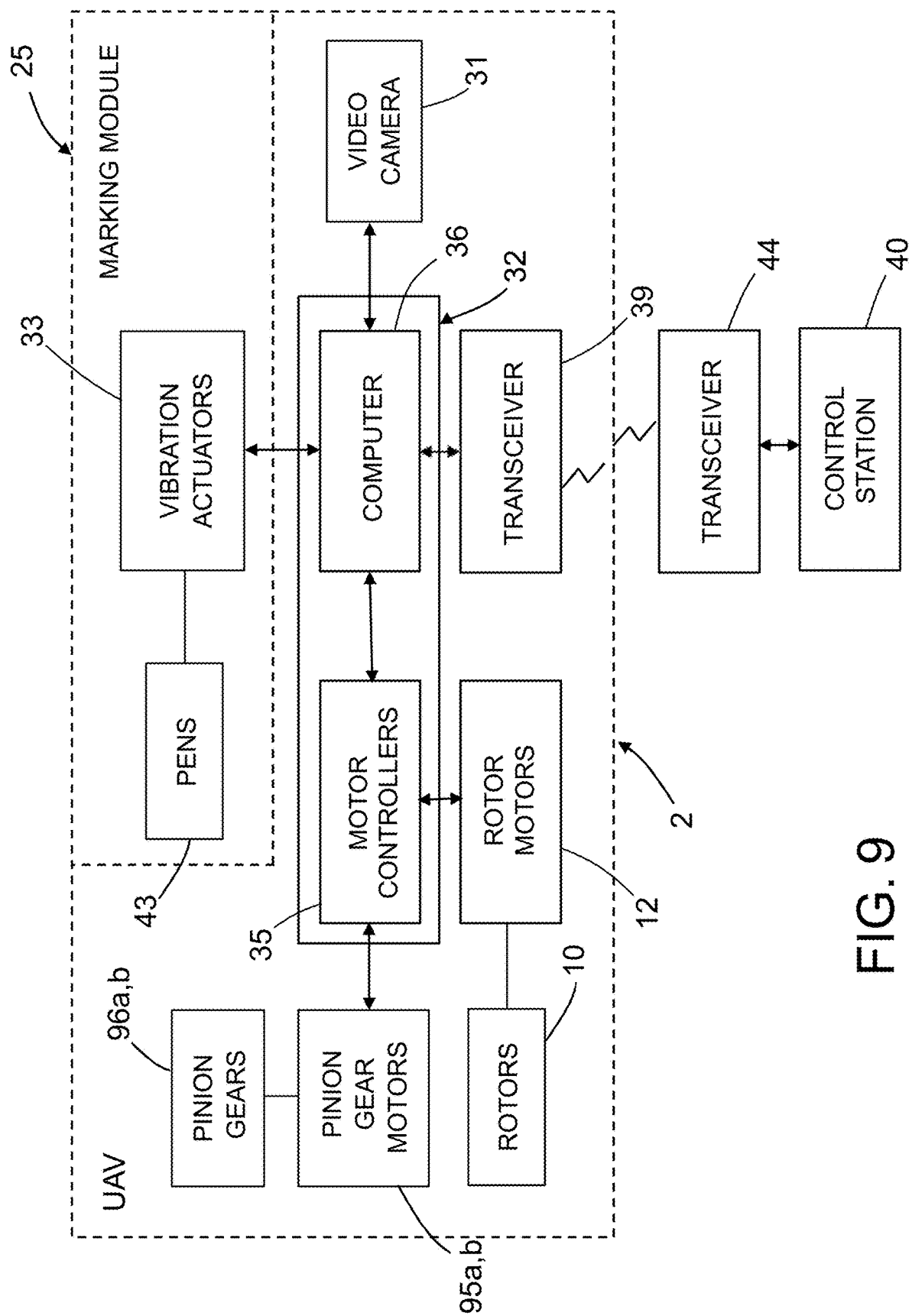
FIG. 9 is a block diagram identifying some components of a system for UAV-enabled marking of a surface in accordance with one embodiment.

FIG. 9 is a block diagram identifying some components of a system for UAV-enabled marking of a surface in accordance with one embodiment. The flying apparatus depicted in FIG. 9 includes a UAV 2 and a marking module 25 carried by UAV 2. The system further includes a control station 40 configured to remotely control the flight of UAV 2 and the operations of pinion gear motors 95a and 95b mounted to the body frame of the UAV 2 and the operations of a plurality of vibration actuators 33 mounted to the module frame of the marking module 25.

The flight of the UAV 2 is controlled by a flight controller 32 that includes a computer 36 and a plurality of motor controllers 35. The computer 36 controls the flight of the UAV 2 by sending commands to the motor controllers 35 which respectively control the operation of respective rotor motors 12 that drive rotation of rotors 10. In accordance with one flight mode, the computer 36 is configured to control the flight of the UAV 2 as a function of radiofrequency commands transmitted by a transceiver 44 from a ground-based operations center. Those radiofrequency commands are received by a transceiver 39 on-board the UAV 2, converted into the proper digital format, and then forwarded to computer 36 of the flight controller 32. The UAV 2 includes a video camera 31 (which may be mounted to a pan-tilt mechanism not shown in FIG. 9) that provides images for use in flight control or recorded for documentation. For example, as the UAV 2 approaches the surface area of interest on a limited-access structure or object, the video camera 31 may capture images of the area of interest to assist in controlling the UAV 2 so that the marking module 25 can be directed to land on the surface at a position overlying an area to be marked.

The control station 40 may comprise a general-purpose computer system configured with programming for controlling operations of both the UAV 2 and the actuators controlling the marking module 25. For example, the pan and tilt angles of the pan-tilt mechanism, and therefore the orientation of the video camera 31, can be controlled using the keyboard, mouse, touchpad, or touchscreen of the computer system at the control station 40 or other user interface hardware (e.g., a gamepad). In addition, the computer system of the control station 40 may comprise a display processor configured with software for controlling a display monitor (not shown in FIG. 9) to display video images of the marked surface.

As previously described, the UAV 2 includes pinion gears 96a and 96b which are driven to rotate by pinion gear motors 95a and 95b respectively. In accordance with the embodiment represented in FIG. 9, the marking module 25 includes a plurality of pens 43. In some types of pens (e.g., permanent markers), the ink does not flow consistently unless there is motion of the marker against the surface. The technology proposed herein addresses that issue by connecting the pens 43 to respective vibration actuators 33. The control station 40 is configured to remotely control the operations of pinion gear motors 95a and 95b and vibration actuators 33.

In accordance with one proposed implementation, the vibration actuators 33 are vibration motors of the type that includes miniature eccentric rotating masses. Such vibration motors rely on the rotation of an unbalanced load to create vibration effects. The use of vibration is especially important on metal or slippery (painted) surfaces. In an alternative proposed implementation, means for rotating the pen about the tip are provided. Either the vibration device or the rotating pen device creates some small amount of motion between the pen and the surface, which allows the pen to more reliably transfer the ink, instead of just touching the surface (without vibration) and maybe not transferring any mark. The use of vibration is optional since it is not needed for all types of surfaces, but may be useful in marking those with lower coefficients of friction.

Figure 10:
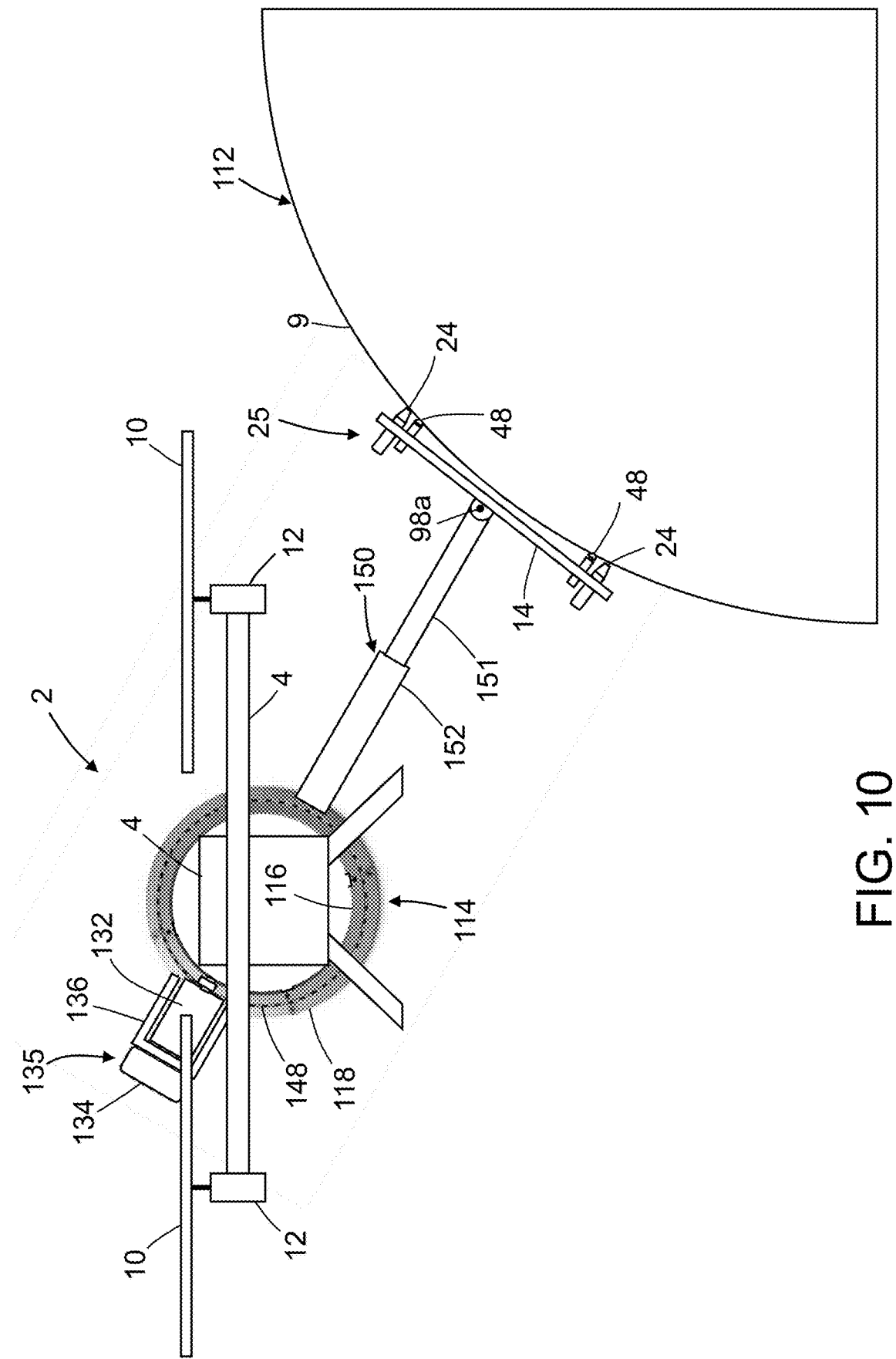
FIG. 10 is a diagram representing a side view of a marking module-carrying UAV in accordance with another embodiment in which the marking module is coupled to a distal end of a telescoping arm mounted to a rotating ring incorporated in the UAV.
Figure 10A:
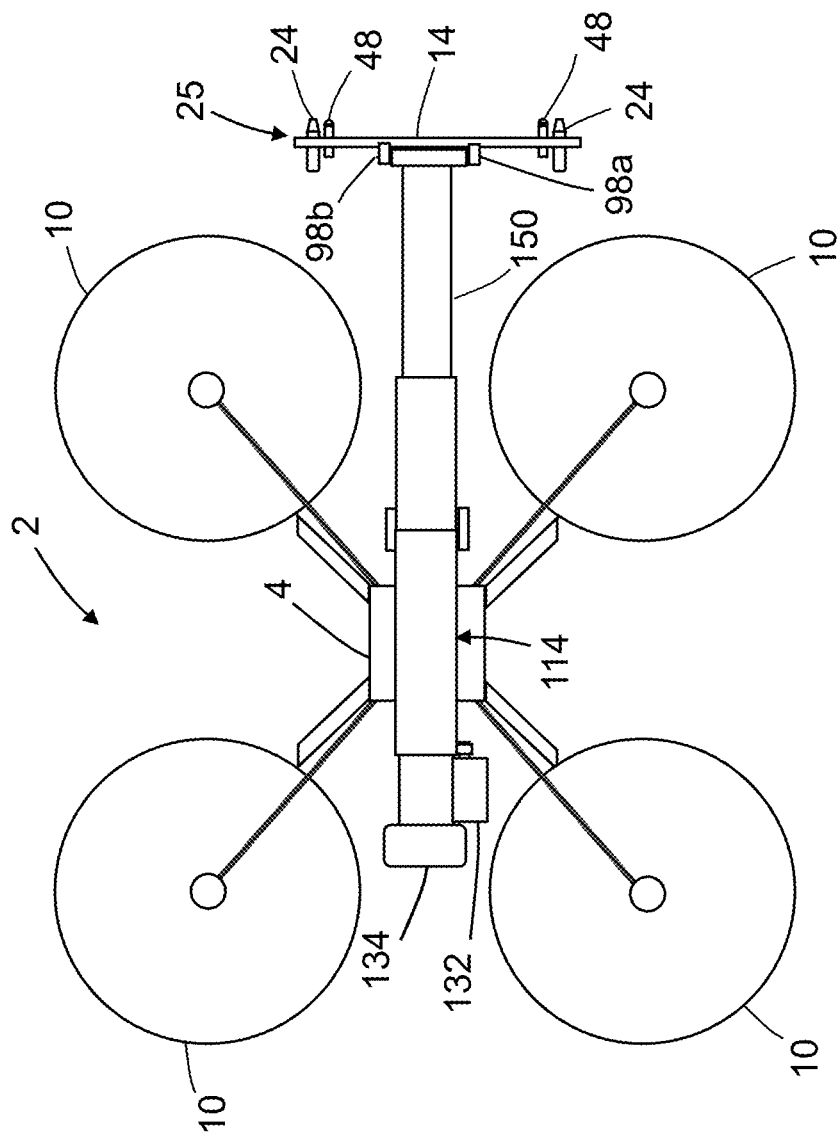
FIGS. 10A-10C are diagrams representing top, side, and front views respectively of the UAV depicted in FIG. 10.
Figure 10B:
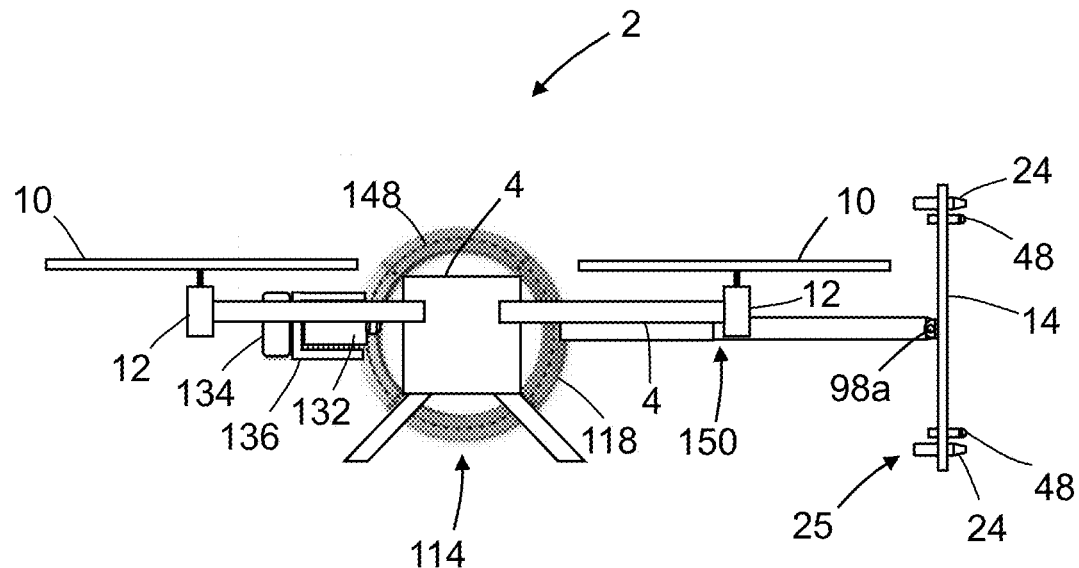
Figure 10C:
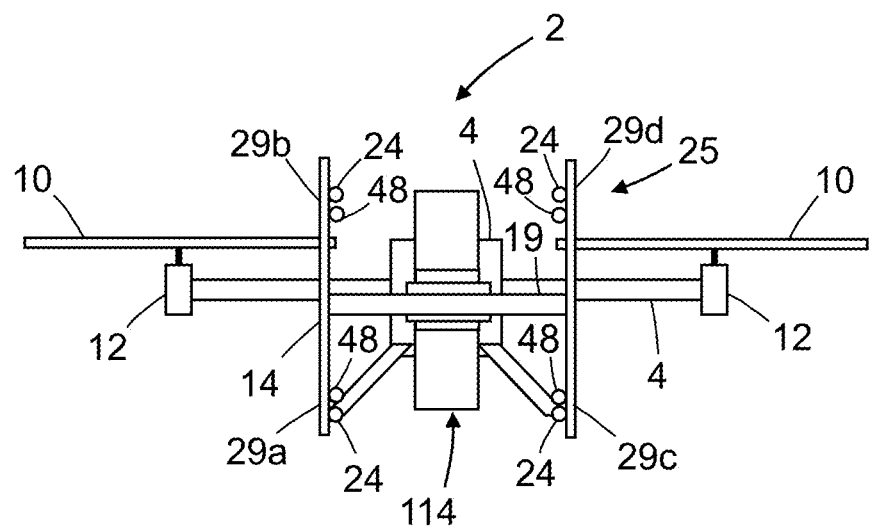

FIG. 10 is a diagram representing a side view of a marking module-carrying UAV 2 in accordance with another embodiment in which the marking module 25 is pivotably coupled to a distal end of a telescoping arm 150, which is in turn connected to a rotating ring mount 114 which is rotatably coupled to the UAV body frame 4. FIGS. 10A-10C are diagrams representing top, side, and front views respectively of the UAV 2 depicted in FIG. 10. The rotating ring mount 114 includes an inner ring 116 mounted to the UAV body frame 4 and an outer ring 118 that is rotatably coupled to the inner ring 116 by means of a multiplicity of rolling elements 148 (e.g., ball bearings). The rotating ring mount 114 enables the telescoping arm 150 to rotate around body frame 4. The telescoping arm 150 includes an outer proximal tube 152 affixed to the outer ring 118 and an inner distal tube 151 that is supported by and displaceable relative to the outer proximal tube 152. When the telescoping arm 150 is extended as depicted in FIG. 10, the marking module 25 may be landed on the surface 9. Optionally, the rotatable arm subassembly may include a targeting camera (not shown in FIG. 10) coupled to outer ring 118. The targeting camera (e.g., a video camera) may be used to capture images of the area on the surface to be marked.

The outer ring 118 is part of a subassembly (hereinafter "rotatable arm subassembly") that is rotatable about a center of the inner ring 116. The rotatable arm subassembly further includes the telescoping arm 150 and a counterweight 135 which are mounted (fixedly coupled) to the outer ring 118 at diametrically opposed angular positions. The rotating ring mount 114, telescoping arm 150, and counterweight are designed to provide a balanced rotational system that allows the telescoping arm 150 to rotate about the center of the inner ring 116 without changing the location of the center-of-mass of the module-equipped UAV 2. The rotating ring mount 114 enables the pitch angle of the telescoping arm 150 to be adjusted as the marking module 25 approaches surface 9. In addition, the yaw angle of the telescoping arm 150 may be adjusted by controlling the yaw angle of the UAV 2.

The counterweight 135 includes a platform 136 which is attached to or integrally formed with and extending outward from the outer ring 118. The counterweight 135 further includes arm pitch control motor 132 and an electric power system 134, both of which are mounted to platform 136. The arm pitch control motor 132 drives rotation of the outer ring 118 relative to the inner ring 116. The electric power system 134 includes a battery (or battery pack) and associated electronics for providing electric power to the arm pitch control motor 132 and other electrically powered components. The counterweight 135 further includes means for mechanically coupling the outer ring 118 to the arm pitch control motor 132 to enable the latter to drive rotation of outer ring 118 relative to inner ring 116. In accordance with one proposed implementation, the mechanical coupling that drives rotation of outer ring 118 includes a pinion gear mounted to an output shaft of the arm pitch control motor 132 and a ring gear which is mounted to or integrally formed with the outer ring 118 and is engaged by the pinion gear (not shown in FIG. 10). The teeth of the pinion gear are meshed with the teeth of the ring gear, so that outer ring 118 rotates about the UAV pitch axis in response to operation of arm pitch control motor 132.

The embodiments described above are designed to mark a surface of a limited-access structure or object at a number of points equal to the number of marking devices carried by the UAV. Those marking devices are pre-arranged to produce a desired pattern of dot-shaped marks. In contrast, various embodiments of apparatus configured to mark the surface of a limited-access structure or object with free-form line drawing capability will be described in some detail below. Some embodiments include a mechanical marking device mounted to an electro-mechanical 2-D plotter. Other embodiments include an optical marking device mounted to an electro-mechanical 2-D plotter. These marking modules with plotter form the "payload" that is carried by the UAV. Such a payload may be fixedly or pivotably coupled to the body frame of the UAV or may be fixedly coupled to a payload support frame which is pivotably or releasably coupled to the body frame.

FIGS. 11A through 11D are diagrams representing respective three-dimensional views of a UAV 2 having a pivotable arm 3 (hereinafter "arm 3") for carrying a payload 6 at successive stages during a process of transporting and placing the payload 6 on a surface 9 of a structure or object. The arm 3 is pivotably coupled to the frame 4 of the UAV 2 by means of a pivot 5 which is supported by a pivot support 4a. The support frame 4a is attached to or integrally formed with frame 4. The payload 6 is coupled to one end of arm 3 by a coupling mechanism 15 (visible in FIG. 11D). A counterweight 7 is coupled to the other end of arm 3. The payload 6 and counterweight 7 have respective known weights. Controlling the arm 3 to align the payload 6 with a portion of the surface 9 involves controlling the arm 3 taking one or more parameters into account. Specifically, controlling the angular position of arm 3 may be based on the arm length, fulcrum point (at pivot 5), counterweight, and payload weight. Controlling the angular position of arm 3 based on these factors may prevent the UAV 2 from substantially pitching when aligning the payload 6 with a portion of the surface 9 to be contacted by the payload 6. The location (position and orientation) of the pivot 5 relative to the surface 9 may be adjusted until the payload 6 lands on surface 9 by adjusting the location of the UAV 2 as it hovers in the vicinity of surface 9. The angular position of arm 3 relative to the body frame 4 of UAV 2 may also be adjusted during flight.

Figure 11A:
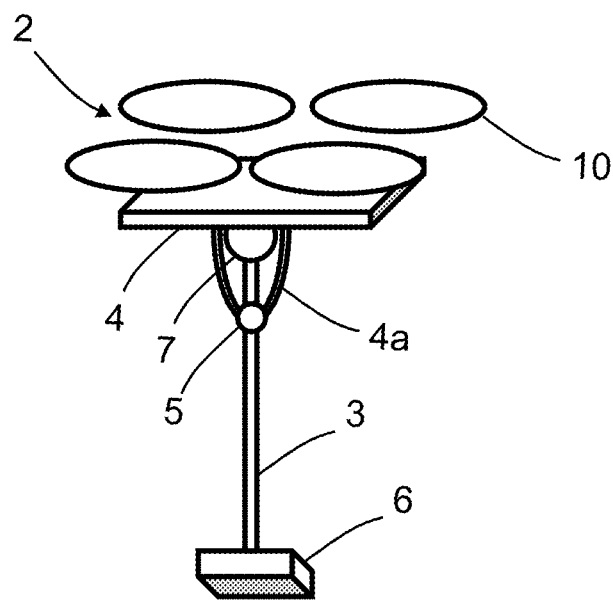
FIGS. 11A-11D are diagrams representing respective three-dimensional views of a UAV having a pivotable arm for carrying a payload at successive stages during a process of transporting and placing the payload on a surface of a limited-access structure or object.
Figure 11B:
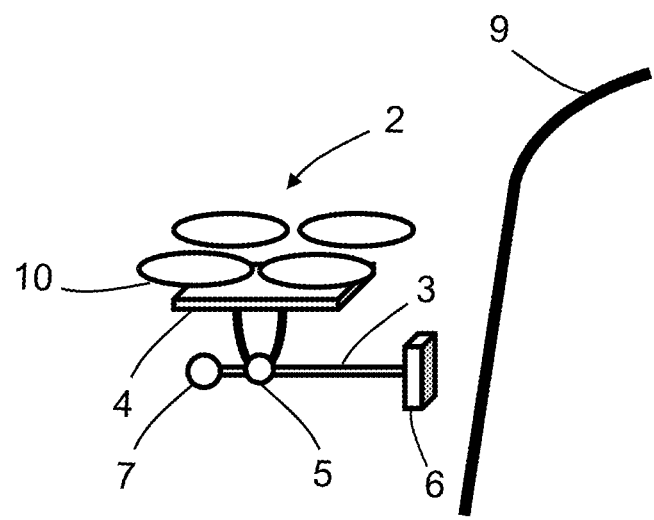
Figure 11C:
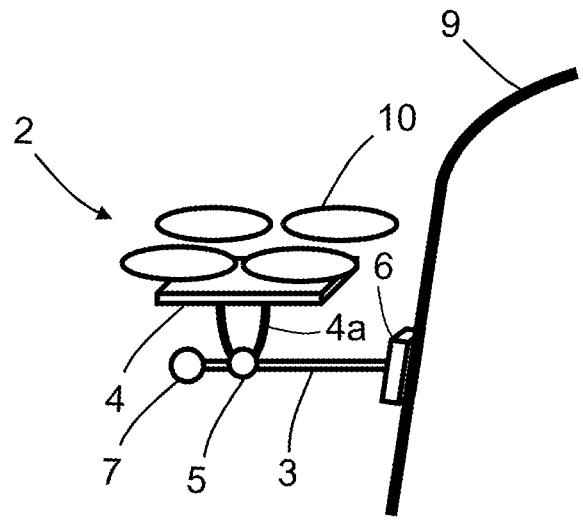
Figure 11D:
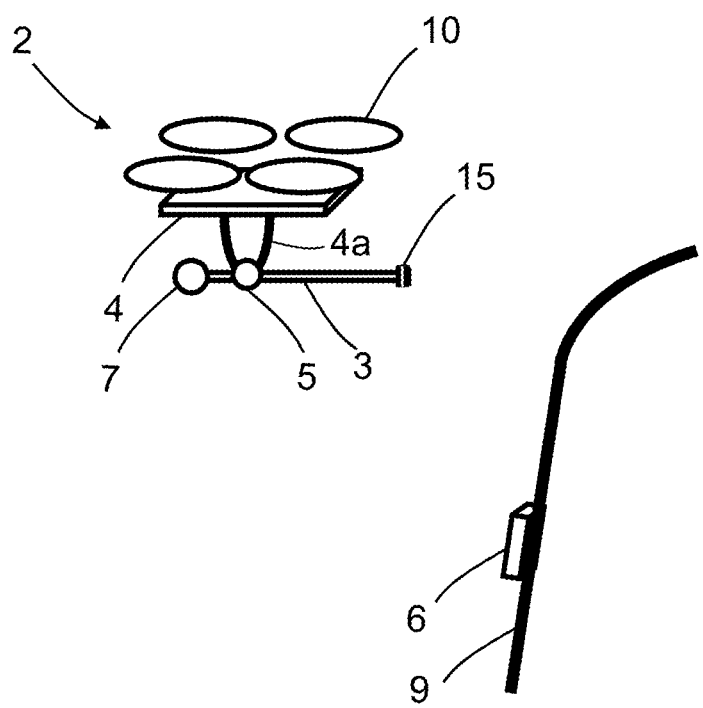

FIG. 11B depicts the UAV 2 flying toward the surface 9 while the arm 3 is oriented generally horizontal. Changing the angle of arm 3 may be accomplished using a motor (not shown in FIGS. 11A-11D) mounted to the pivot support 4a and operatively coupled to the arm 3 by a gear train or a linear actuator (neither of which are shown in FIGS. 11A-11D) that has one end connected to pivot support 4a and another end connected to arm 3 at a point located at a distance from pivot 5. FIG. 11C depicts a stage wherein the payload 6 is lying flat against the surface 9. FIG. 11D depicts a stage wherein the UAV 2 is flying away from the surface 9 after the payload 6 has been uncoupled from the arm 3 while in the state depicted in FIG. 11C. The uncoupled payload 6 may stay attached to the surface 9 due to attachment forces exerted by a plurality of surface attachment devices (not shown in FIGS. 11A-11D), such as magnetic-based devices, e.g., an electro-permanent magnet, for ferromagnetic structures, and/or vacuum-based, electrostatic-based, adhesive-based, or gripper-based devices for non-ferromagnetic structure.

In accordance with one embodiment of a method for UAV-enabled marking of the surface of a limited-access structure, a marking module-carrying UAV of the type shown in FIG. 3A flies to a location such that the payload 6 (e.g., a marking module) overlies to a target area (e.g., a damage area) on the surface of the structure. Then the marking module is activated to apply a pattern of markings (e.g., a grid) while the UAV 2 remains parked on the surface 9 and holds the marking module in place.

In accordance with an alternative embodiment, the coupling mechanism 15 is a quick-disconnect mechanism (e.g., a quick disconnect collet) adapted to hold the payload 6 during flight. The UAV 2 may be flown to a location in proximity to the target area and then the payload 6 is placed on the surface 9 of the structure. Surface attachment devices incorporated in the payload 6 (e.g., a marking module) may then be activated to temporarily but securely attach the payload 6 to the surface 9, following which the payload 6 may be uncoupled from the UAV 2. The UAV 2 is then free to take off from the surface 9, leaving the payload 6 (e.g., a marking module) to perform the marking procedure.

The payload-carrying UAV 2 depicted in FIG. 11A is equally well adapted for use in marking a wide range of structures including, but not limited to, aircraft, wind turbine blades, storage tanks, power lines, power-generating facilities, power grids, dams, levees, stadiums, large buildings, bridges, large antennas and telescopes, water treatment facilities, oil refineries, chemical processing plants, high-rise buildings, and infrastructure associated with electric trains and monorail support structures. The system is also particularly well suited for use inside large buildings such as manufacturing facilities and warehouses. Virtually any structure that would be difficult, costly, or too hazardous to be marked manually by a human may potentially be marked using the systems described herein. The method takes advantage of the broadening use of UAVs to reduce the cost, time, and ergonomic issues related to manufacturing and maintenance activities in aerospace and other industries.

Figure 12A:
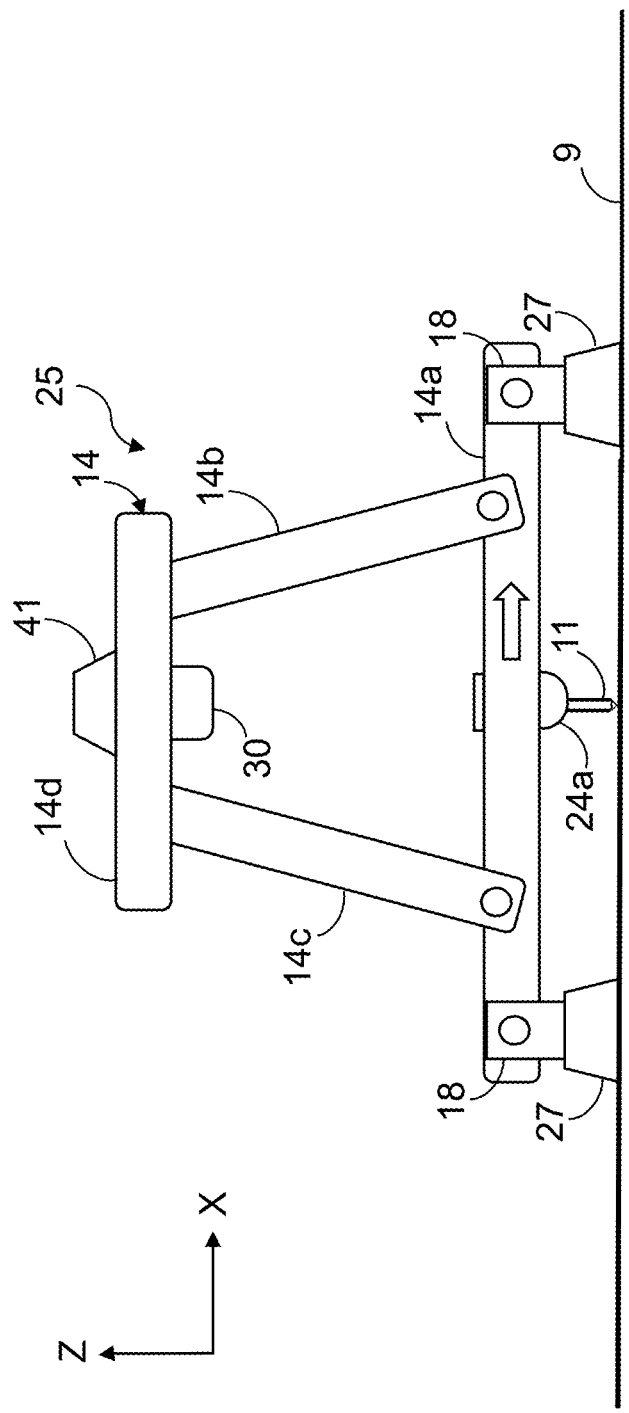
FIG. 12A is a diagram representing a side view of a marking module including a marking device having a contact tip in accordance with one embodiment, which marking module may be a payload carried by a UAV of the types depicted in FIG. 10A or a type having a different design.

FIG. 12A is a diagram representing a side view of a marking module 25 including a mechanical marking device 24a in accordance with an alternative embodiment, which marking module 25 may be a payload carried by a UAV 2 of the type depicted in FIG. 11D or a type having a different design. The marking module 25 includes an attachment point 41 which may be coupled to (and uncoupled from) a distal end of arm 3 of the UAV 2 depicted in FIG. 11D. The mechanical marking device 24a may be a marking tool 11 (e.g., a pen), as depicted in FIG. 12A. In the alternative, the marking device may be electro-mechanical (e.g., an ink jet printer not depicted in FIG. 12A). The marking module 25 in combination with a UAV 2 form an apparatus capable of marking the surface 9 of a limited-access structure or object.

As seen in the proposed implementation depicted in FIG. 12A, the marking module 25 includes a module frame 14 which may consist of rigid or semi-rigid members which are integrally formed or fastened or joined together. The module frame 14 supports an electro-mechanical 2-D plotter (not shown in FIG. 12A, but see electro-mechanical 2-D plotter 17a in FIG. 13) that carries the mechanical marking device 24a. The electro-mechanical 2-D plotter 17a is mounted to a base 14a of module frame 14. The base 14a has an opening which is configured to allow the mechanical marking device 24a to access and mark the area under the opening. The attachment point 41 is connected to or integrally formed with a top 14d of module frame 14. The module frame 14 further includes a multiplicity of vertical support members that connect the base 14a to the top 14d. Only two vertical support members 14b and 14c are visible in FIG. 12A. For example, the frame may have four vertical support members, the third and fourth vertical support members being disposed behind vertical support members 14b and 14c respectively in the view presented in FIG. 12A.

The module frame 14 further includes a plurality of (at least three) standoff support members 18. A respective surface attachment device 27 is coupled to the distal end of each standoff support member 18. In the example marking scenario depicted in FIG. 12A, the surface attachment devices 27 attach or adhere to a surface 9. The surface attachment devices 27 may be selected from the following types: magnetic-based devices (e.g., an electro-permanent magnet) for ferromagnetic structures, and/or vacuum-based, electrostatic-based, adhesive-based, and gripper-based devices for non-ferromagnetic structure. The standoff support members 18 and surface attachment devices 27 form a standoff system that maintains the mechanical marking device 24*a* at a specified relative position suitable for marking the surface 9.

Figure 12B:
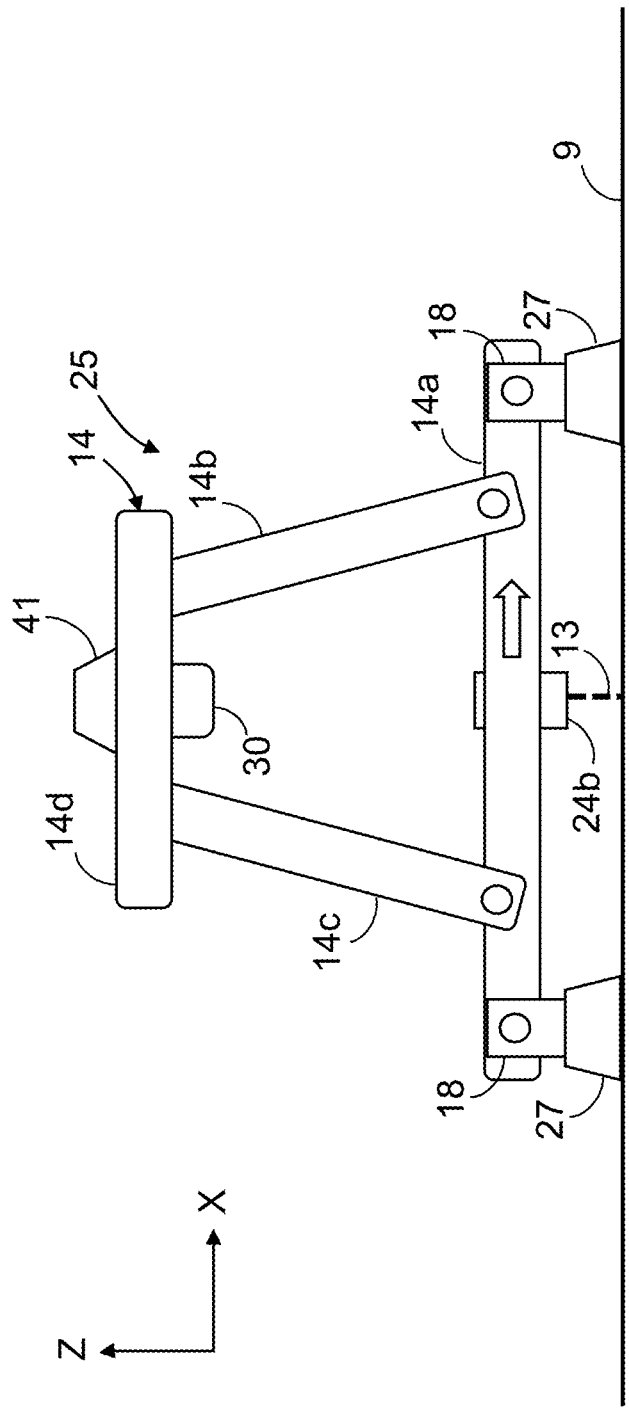
FIG. 12B is a diagram representing a side view of a marking module including a laser in accordance with another embodiment, which marking module may be a payload carried by a UAV of the type depicted in FIG. 12A or a type having a different design.

FIG. 12B is a diagram representing a side view of a marking module 25 including an optical marking device 24*b* in accordance with another embodiment, which marking module 25 may be a payload carried by a UAV 2 of the type depicted in FIG. 3A or a type having a different design. In one proposed implementation, the optical marking device 24*b* includes a laser (not shown in FIG. 12B, but see laser 330 in FIG. 23) capable of producing a laser beam 13 having an intensity sufficient to melt or vaporize the material of the surface to be marked. The module frame 14 of the marking module 25 depicted in FIG. 12B may be identical to the module frame 14 depicted in FIG. 12A. Likewise the module frame 14 supports an electro-mechanical 2-D plotter (not shown in FIG. 12B, but see electro-mechanical 2-D plotter 17*a* in FIG. 13) that holds the optical marking device 24*b*.

In the marking scenario depicted in FIG. 12B, the marking module is located so that the optical marking device 24*b* is directed to the surface 9 to be marked. In accordance with one proposed implementation, the optical marking device 24*b* is a laser that emits a laser beam 13 which propagates parallel to the Z-axis and then impinges on the surface 9 to form a laser spot. The laser is configured to produce a light beam 13 of sufficient intensity to melt or vaporize the material of the surface 9 at the laser spot. The laser may be controlled to emit respective pulses intermittently at different positions as the laser spot is moved by the 2-D plotter (not shown in FIG. 12B) along a predetermined scan path.

Figure 13:
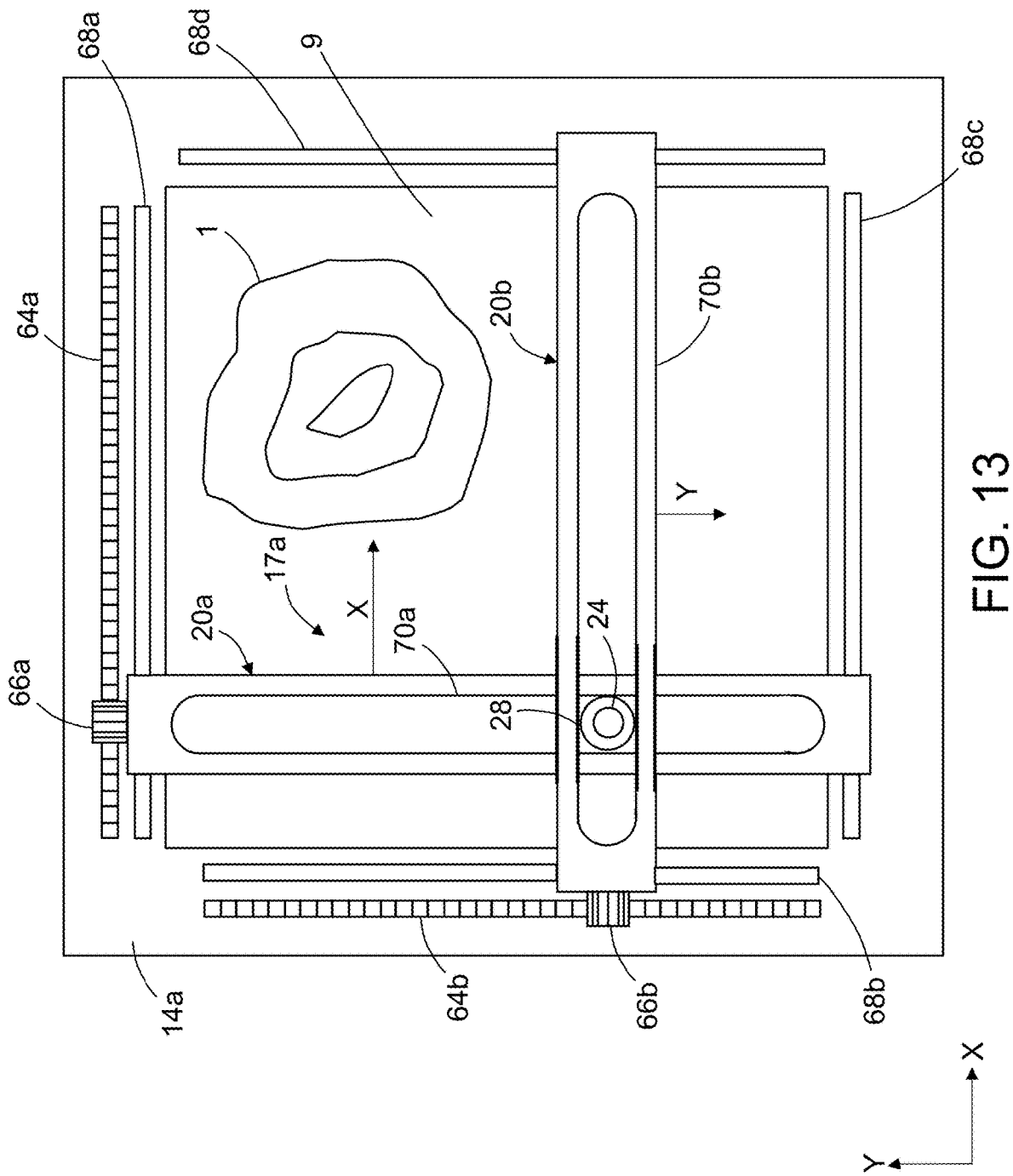
FIG. 13 is a diagram showing a top view of an electromechanical 2-D plotter overlying a dent or gouge or other cavity-type anomaly where material has been removed from the surface (hereinafter "cavity"). The plotter includes a holder that holds a marking device, such as the marking device shown in either FIG. 12A or FIG. 12B.

In accordance with some embodiments, the marking device is moved over a two-dimensional (2-D) area by means of an electro-mechanical 2-D plotter. FIG. 13 is a diagram showing a top view of an electro-mechanical 2-D plotter 17*a* overlying a dent or gouge or other type of anomaly 1 where material has been removed from the surface 9. The plotter 17*a* includes a device holder 28 that holds a marking device 24, such as the marking device shown in either FIG. 12A or FIG. 12B. In accordance with one proposed implementation, the electro-mechanical 2-D plotter 17*a* includes a device holder 28 that holds a marking device 24 (such as the mechanical marking device 24*a* shown in FIG. 12A or the optical marking device 24*b* shown in FIG. 12B) for marking a target area on surface 9. The electro-mechanical 2-D plotter 17*a* is movably coupled to the base 14*a* of the module frame 14. The marking device 24 is supported by the electro-mechanical 2-D plotter 17*a* and configured to create marks in accordance with a specified (pre-programmed) pattern when the surface attachment devices 27 are in contact with the surface 9. A computer (not shown in FIG. 13, but see computer 42 in FIG. 16) is programmed to control the electro-mechanical 2-D plotter 17*a* and the marking device 24 so that marks are produced at multiple spots along a predefined motion path.

In accordance with the embodiment depicted in FIG. 13, the electro-mechanical 2-D plotter 17*a* includes a first traveling bridge 20*a* that is slidably coupled to the base 14*a* of the module frame 14 for translation in an X direction and has a longitudinal slot; and a second traveling bridge 20*b* that is slidably coupled to the base 14*a* for translation in a Y direction (perpendicular to the X direction) and has a longitudinal slot 70*b* that crosses the longitudinal slot 70*a*. The marking device 24 is supported by the device holder 28 at a crossing of the longitudinal slots 70*a* and 70*b*. The device holder 28 has a first portion that is coupled to longitudinal slot 70*a* in a manner that enables the marking device 24 to translate in an X direction and a second portion that is coupled to longitudinal slot 70*b* in a manner that enables the marking device 24 to translate in a Y direction. For example, the device holder 28 may have one annular projection which slides in respective linear grooves formed in the sides of longitudinal slot 70*a* and another annular projection which slides in respective linear grooves formed in the sides of longitudinal slot 70*b*. In alternative implementations, various types of bearings may be employed.

The first and second traveling bridges 20*a* and 20*b* are independently translatable in the X and Y directions respectively. For example, the first traveling bridge 20*a* may translate in the X direction while the second traveling bridge 20*b* does not move relative to base 14*a*, in which case the marking device 24 is moved in the X direction while sliding in longitudinal slot 70*b* in the second traveling bridge 20*b*. Conversely, the second traveling bridge 20*b* may translate in the Y direction while the first traveling bridge 20*a* does not move relative to base 14*a*, in which case the marking device 24 is moved in the Y direction while sliding in longitudinal slot 70*a* in the first traveling bridge 20*a*. Such movements may be included in a planned motion path.

Still referring to FIG. 13, the first traveling bridge 20*a* has respective bearing guides (not shown in FIG. 13) at opposite ends thereof, which bearing guides travel (e.g., slide or roll) along respective guide rails 68*a* and 68*c* disposed on opposing sides of base 14*a*. The first traveling bridge 20*a* further includes a motor (not shown in FIG. 13) that is operatively coupled to a first pinion gear 66*a*. The first pinion gear 66*a* has teeth which engage teeth of a first rack 64*a* that is disposed parallel to and spaced apart from the guide rail 68*a*. The motor may be activated to drive rotation of the first pinion gear 66*a*, which in turn causes the first traveling bridge 20*a* to translate in the X direction on guide rails 68*a* and 68*c*. Similarly, the second traveling bridge 20*b* has respective bearing guides (not shown in FIG. 13) at opposite ends thereof, which bearing guides travel (e.g., slide or roll) along respective guide rails 68*b* and 68*d* disposed on the other opposing sides of the base 14*a*. The second traveling bridge 20*b* further includes a motor (not shown in FIG. 13) that is operatively coupled to a second pinion gear 66*b*. The second pinion gear 66*b* has teeth which engage teeth of a second rack 64*b* that is disposed parallel to and spaced apart from the guide rail 68*b*. The motor may be activated to drive rotation of the second pinion gear 66*b*, which in turn causes the second traveling bridge 20*b* to translate in the Y direction on guide rails 68*b* and 68*d*.

Other linear drive means may be substituted for the rack and pinion arrangement shown in FIG. 13, such as a lead screw threadably coupled to a nut incorporated in a bearing guide or carriage. In the latter case, the drive motors would be mounted to the base 14*a* of the module frame 14 rather than mounted to the bridges as is the case in the example wherein the drive mechanism is a pinion gear.

Instead of bearing guides sliding or rolling on guide rails, the first and second traveling bridges 20*a* and 20*b* may be translatably coupled to the base 14*a* of module frame 14 by means of linear motion guides. In this implementation, each guide comprises a respective pair of slidably coupled linear motion guide halves. One pair of linear motion guides translatably couples the first traveling bridge 20*a* to two opposing sides of base 14a; another pair of linear motion guides translatably couples the second traveling bridge 20b to the other two opposing sides of base 14a. As used herein, the term "linear motion guide half" means a structure having a straight surface that guides a contacting surface of another linear motion guide half to move linearly during relative motion of the two halves. More specifically, the term "linear motion guide half" includes, but is not limited to, male and female slide halves well known in the art.

Figure 14:
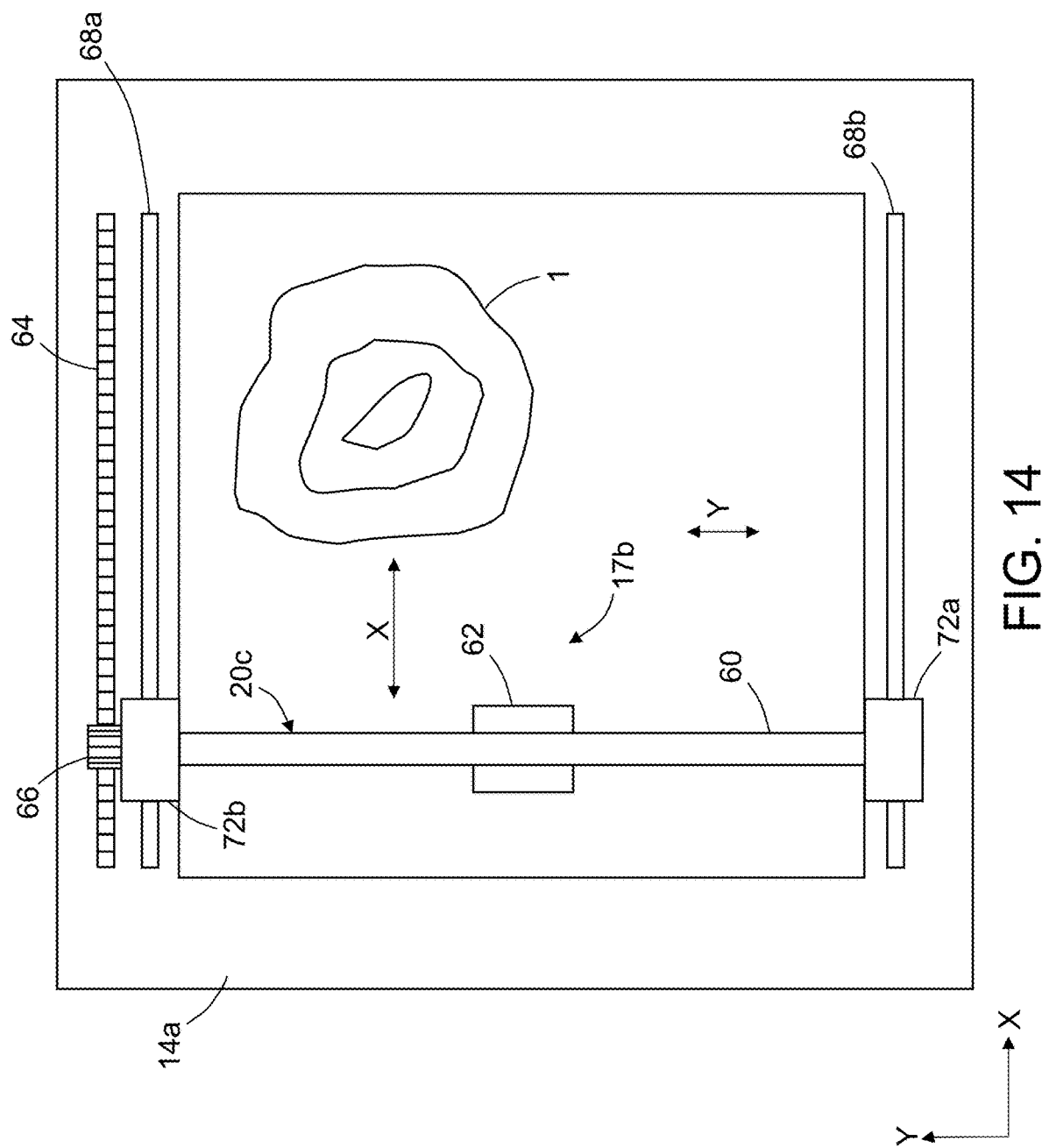
FIG. 14 is a diagram showing a top view of an electromechanical 2-D plotter in accordance with an alternative embodiment. The plotter includes a carriage that carries a marking device and is translatable along a traveling bridge having an axis, which traveling bridge in turn is translatable along another axis which is perpendicular to the bridge axis.

FIG. 14 is a diagram showing a top view of an electromechanical 2-D plotter 17b in accordance with an alternative embodiment. The plotter includes a carriage that carries a marking device and is translatable along a traveling bridge having an axis, which traveling bridge in turn is translatable along another axis which is perpendicular to the bridge axis. The electro-mechanical 2-D plotter 17b comprises a traveling bridge 20c that includes a guide rail 60 and a carriage 62 that is slidably coupled to the guide rail 60. The carriage 62, which carries a marking device (not visible in FIG. 14), is translatable along the guide rail 60 in a Y direction. The traveling bridge 20c is translatable in an X direction. More specifically, the opposing ends of the guide rail 60 are supported by respective bearing guides 72a and 72b. The bearing guides 72a and 72b respectively travel along a pair of mutually parallel guide rails 68a and 68b during movement in the X direction. The guide rails 68a and 68b are disposed on opposing sides of the base 14a of the module frame 14. The electro-mechanical 2-D plotter 17b further includes an X motion drive motor 22a (not shown in FIG. 14, but see FIG. 14A) that is operatively coupled to drive rotation of a pinion gear 66. The pinion gear 66 has teeth which engage teeth of a rack 64 that is disposed parallel to and spaced apart from the guide rail 68a. The X motion drive motor 22a may be activated to drive rotation of the pinion gear 66, which in turn causes the guide rail 60 to translate in the X direction on guide rails 68a and 68b.

The traveling bridge 20c and carriage 62 are independently translatable in the X and Y directions respectively. For example, the traveling bridge 20c may translate in the X direction while the carriage 62 does not move relative to guide rail 60, in which case the marking device 24 (not shown in FIG. 14, see FIG. 14A) is moved in the X direction. Conversely, the carriage 62 may translate relative to guide rail 60 while the traveling bridge 20c does not move relative to base 14a, in which case the marking device 24 (not shown in FIG. 14) is moved in the Y direction. Such movements may be included in a planned motion path.

Figure 14A:
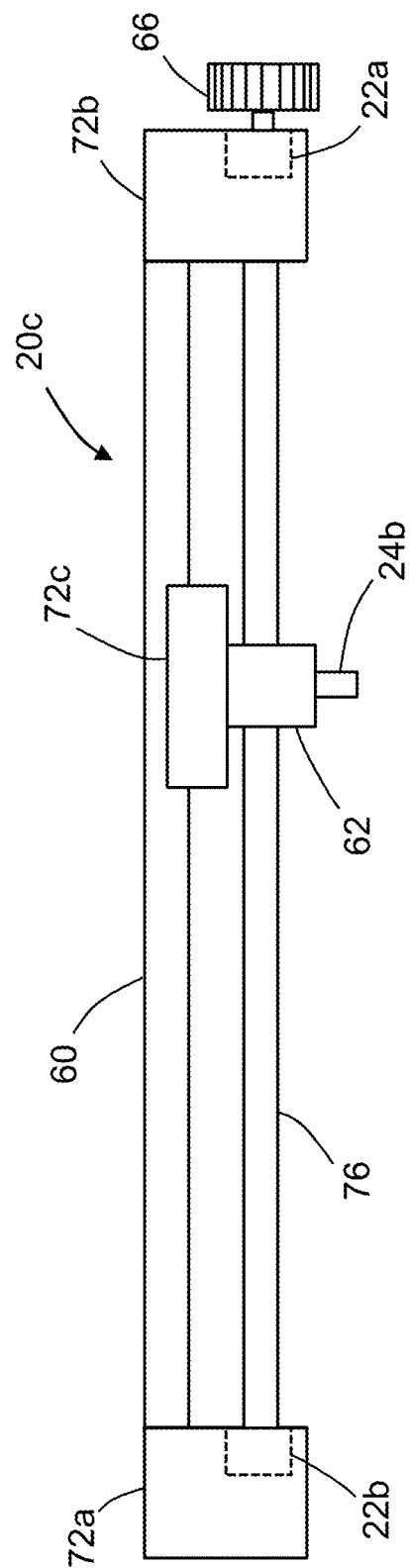
FIG. 14A is a diagram showing a side view of portions of the electro-mechanical 2-D plotter depicted in FIG. 14.

FIG. 14A is a diagram showing a side view of portions of the electro-mechanical 2-D plotter depicted in FIG. 14. The traveling bridge 20c includes bearing guides 72a and 72b which respectively travel (e.g., slide or roll) along the guide rails 68a and 68b (see FIG. 14). The traveling bridge 20c further includes the X motion drive motor 22a that is operatively coupled (via an output shaft) to the pinion gear 66. The pinion gear 66 has teeth which engage teeth of the rack 64 seen in FIG. 14. Opposed ends of the guide rail 60 are fixedly coupled to the bearing guides 72a and 72b. The traveling bridge 20c further includes a bearing guide 72c which is slidably coupled to the guide rail 60 and a carriage 62 which is fixedly coupled to the bearing guide 72c. An optical marking device 24b is fixedly coupled to the carriage 62, having a dependent configuration to enable marking of a surface area underlying the opening in base 14a (see FIG. 14).

A drive mechanism operatively couples the carriage 62 to a Y motion drive motor 22b. The drive mechanism includes a lead screw 76 (threads not shown) and a nut (within carriage 62) that threadably engages the lead screw 76. The nut is installed inside a cavity formed in the carriage 62. The coupling of carriage 62 to the lead screw 76 by means of the nut enables the bearing guide 72c to translate (by sliding) along the guide rail 60 when the lead screw 76 is driven to rotate by Y motion drive motor 22b. The opposing ends of lead screw 76 are supported by respective bearings (not shown in FIG. 14A). Rotation of lead screw 76 may be driven by Y motion drive motor 22b via a belt (not shown) which circulates on respective pulleys. In other embodiments, the lead screw could be driven directly by the motor. Other options include gear drive, cable drive, or chain drive. In accordance with a proposed implementation, the bearing guide 72c comprises a series of recirculating ball bearings, the balls of which roll along the guide rail 60. Optionally, the position of the carriage 62 along the guide rail 60 can be measured by a position sensor (e.g., a rotation encoder coupled to the lead screw 76) to provide position feedback to the motor controller (not shown in FIG. 14A) that controls carriage translation in the Y direction. Similarly, the position of the traveling bridge 20c along the guide rail 68a (see FIG. 14) can be measured by a position sensor to provide position feedback to the motor controller that controls traveling bridge translation in the X direction. In accordance with an alternative embodiment, a mechanical marking device (e.g., a pen) may be substituted for the optical marking device 24b indicated in FIG. 14A.

Figure 15:
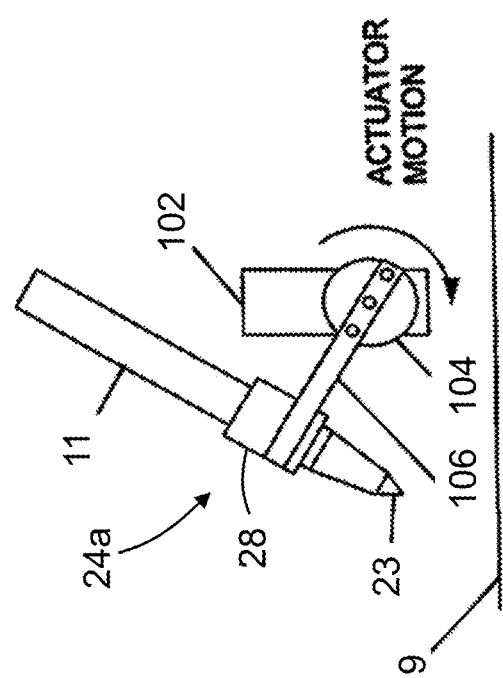
FIG. 15 is a diagram representing a side view of a marking device in a retracted state.

Optionally, the marking tool 11 depicted in FIG. 12A is movable between a retracted (stowed) position and an extended (deployed) position. FIG. is a diagram representing a side view of a mechanical marking device 24a in a state wherein the marking tool 11 (e.g., a pen) is retracted. In the retracted state, a contact tip 23 of the marking tool 11 does not contact the surface 9; in the extended state (not shown in FIG. 15), the contact tip 23 contacts the surface 9. The mechanical marking device 24a further comprises a pen-lifting actuator 102 (e.g., a rotational servo motor) which is mounted to the plotter. The marking tool 11 is connected to an output shaft (not visible in FIG. 15) of actuator 102 by means of a hub 104, an arm 106, and marking tool holder 28. The hub 104 is attached to an end of the output shaft of actuator 102. The arm 106 has a proximal end attached to hub 104. The distal end of arm 106 may be a yoke that supports the marking tool holder 28. Thus, the marking tool 11 is rotated when the output shaft of pen-lifting actuator 102 rotates.

In accordance with alternative embodiments, the mechanical marking device 24a can be actuated by linear motion instead of rotation. For example, the mechanical marking device 24a can be coupled to the plotter by means of a vertical lifting mechanism. This vertical lifting mechanism may use a rotational servo actuator with a rack-and-pinion mechanism to turn the rotational motion of the servo into linear (translational) motion of the marking tool 11.

Figure 16:
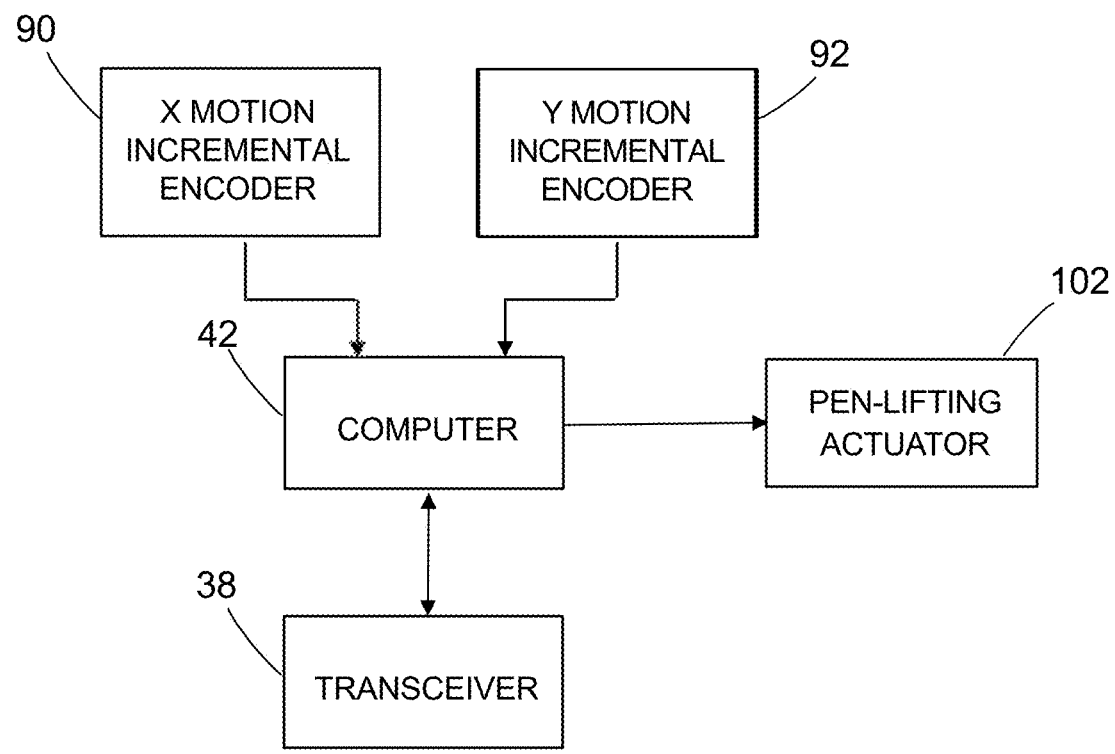
FIG. 16 is a block diagram identifying components of a control system that uses rotation encoders to track the relative location (e.g., relative to an initial position acquired using a local positioning system) of a carriage and activate an actuator to move a marking device from a retracted position to an extended position in which a tip of the marking device contacts the surface to be marked.

FIG. 16 is a block diagram identifying some components of a system for drawing lines on a surface by moving a marking device 24a over an area of a surface using the traveling bridge 20c partly depicted in FIG. 14. The system depicted in FIG. 16 includes a computer 42 that is programmed to collect encoded data representing the spatial coordinates of the pen-lifting actuator 102 and then process that position data to determine how to command the plotter and the pen-lifting actuator 102 to ensure that a contact tip of the marking device 24a is positioned at a specified marking site. The Y position of the pen-lifting actuator 102 is tracked using a Y motion incremental encoder 92; the X position of the pen-lifting actuator 102 is tracked using an X motion incremental encoder 90. The pen moves from a retracted position to an extended position or vice versa when the pen-lifting actuator 102 is activated. In accordance with some embodiments, the X and Y motion incremental encoders 90 and 92 may be either optical or magnetic linear encoders.

Upon initiation of a marking task, the computer 42 issues commands which cause the pen-lifting actuator 102 to be moved to a starting X-Y coordinate position. Then the computer 42 issues a control signal which activates the actuator 102 to rotate the pen into contact with the surface. Thereafter, the computer 42 issues commands to the plotter motors (not shown in FIG. 16) which cause the pen to move along a motion path. The computer 42 receives electrical signals from the X and Y motion incremental encoders 90 and 92, which cause the pen to draw a continuous line or successive connected line segments on the surface of the limited-access structure or object. When a line or line segment is finished, computer 42 issues a control signal which activates the pen-lifting actuator 102 to rotate the pen out of contact with the surface. Then the routine is repeated for drawing the next line or line segment. The end result of the marking process proposed herein may an alignment grid with alphanumeric symbology, one example of which is described below with reference to FIG. 24. The computer 42 is also configured to construct a task completion message to be transmitted to a ground control station by a transceiver 38.

Figure 17:
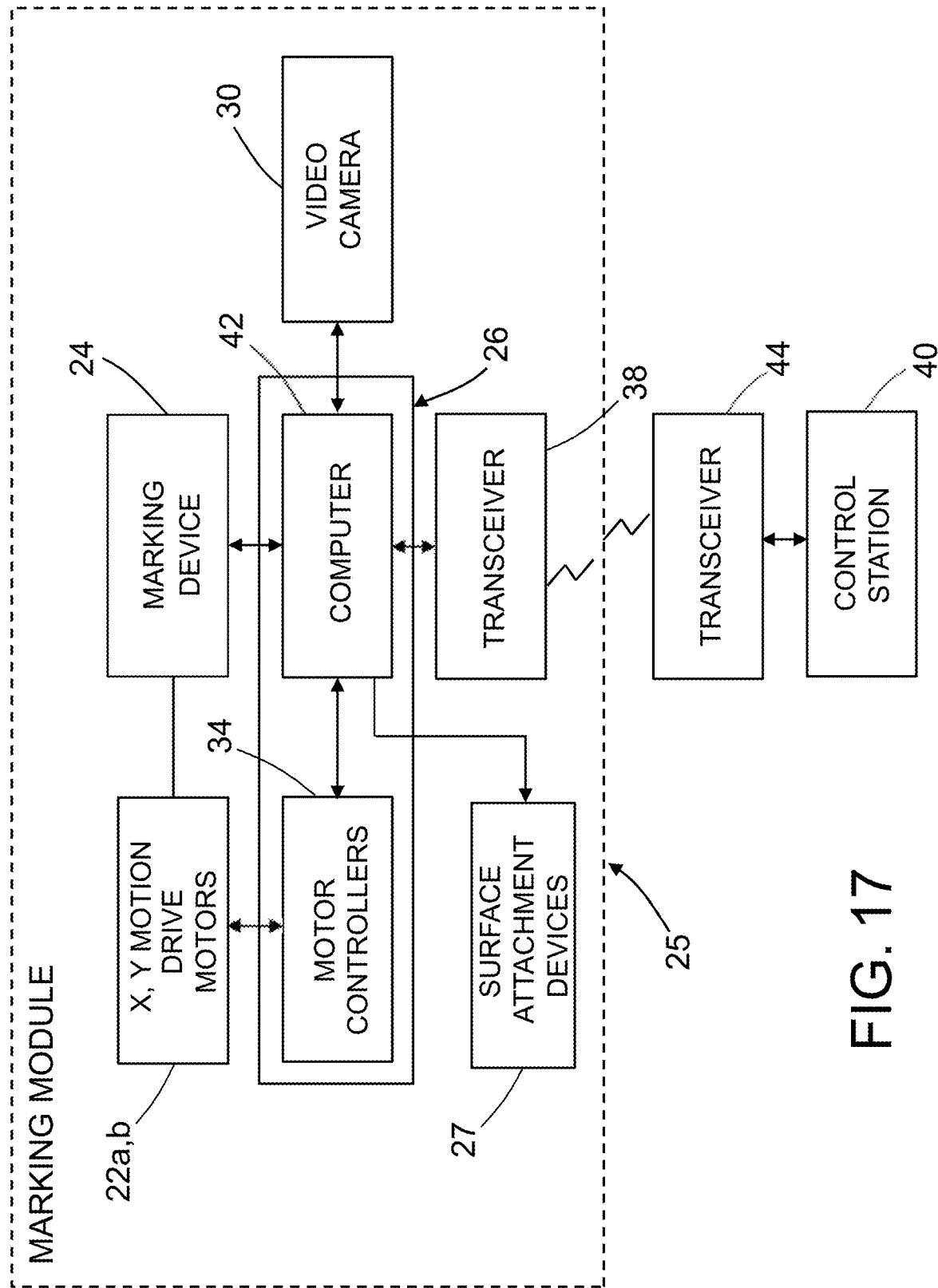
FIG. 17 is a block diagram identifying some components of a system that includes a control station configured to remotely control a marking module in accordance with one embodiment in which a marking device is carried by an electro-mechanical 2-D plotter.

FIG. 17 is a block diagram identifying some components of a marking module 25 which has an electro-mechanical 2-D plotter and is remotely controlled by a control station 40. Electrical power to all electrically powered components of the marking module 25 is provided by a battery (not shown). As shown in FIG. 17, the module controller 26 is communicatively coupled to all electrical and electro-mechanical components of the marking module. The module controller 26 includes a computer 42 and motor controllers 34 which are communicatively coupled to the computer 42. The motor controllers 34 are configured for controlling X and Y motion drive motors 22a and 22b which drive translation of the first and second traveling bridges 20a and 20b identified in FIG. 13 or the first traveling bridge 20a and carriage 62 identified in FIG. 14. For example, the computer 42 may be programmed to control operation of the X and Y drive motors 22 so that the marking device 24 travels along a predefined motion path. In addition, the computer 42 controls operation of the marking device 24 and the video camera 30. The previously described surface attachment devices 27 also operate under the control of computer 42.

In the embodiment partly depicted in FIG. 17, X and Y drive motors 22, marking device 24, and video camera 30 are controlled by the computer 42 as a function of radiofrequency commands transmitted by a control station 40 on the ground. Those radiofrequency commands are transmitted by a transceiver 44 on the ground, received by a transceiver 38 incorporated in the marking module 25, and converted by the transceiver 38 into the proper digital format. The resulting digital commands are then forwarded to the computer 42. The control station 40 may comprise a general-purpose computer system configured with programming for controlling operation of the marking module 25. In addition, the computer system (not shown in FIG. 17) of the control station 40 may comprise a display processor configured with software for controlling a display monitor to display images of the surface acquired by the video camera 30 before, during and, after marking.

Figure 18:
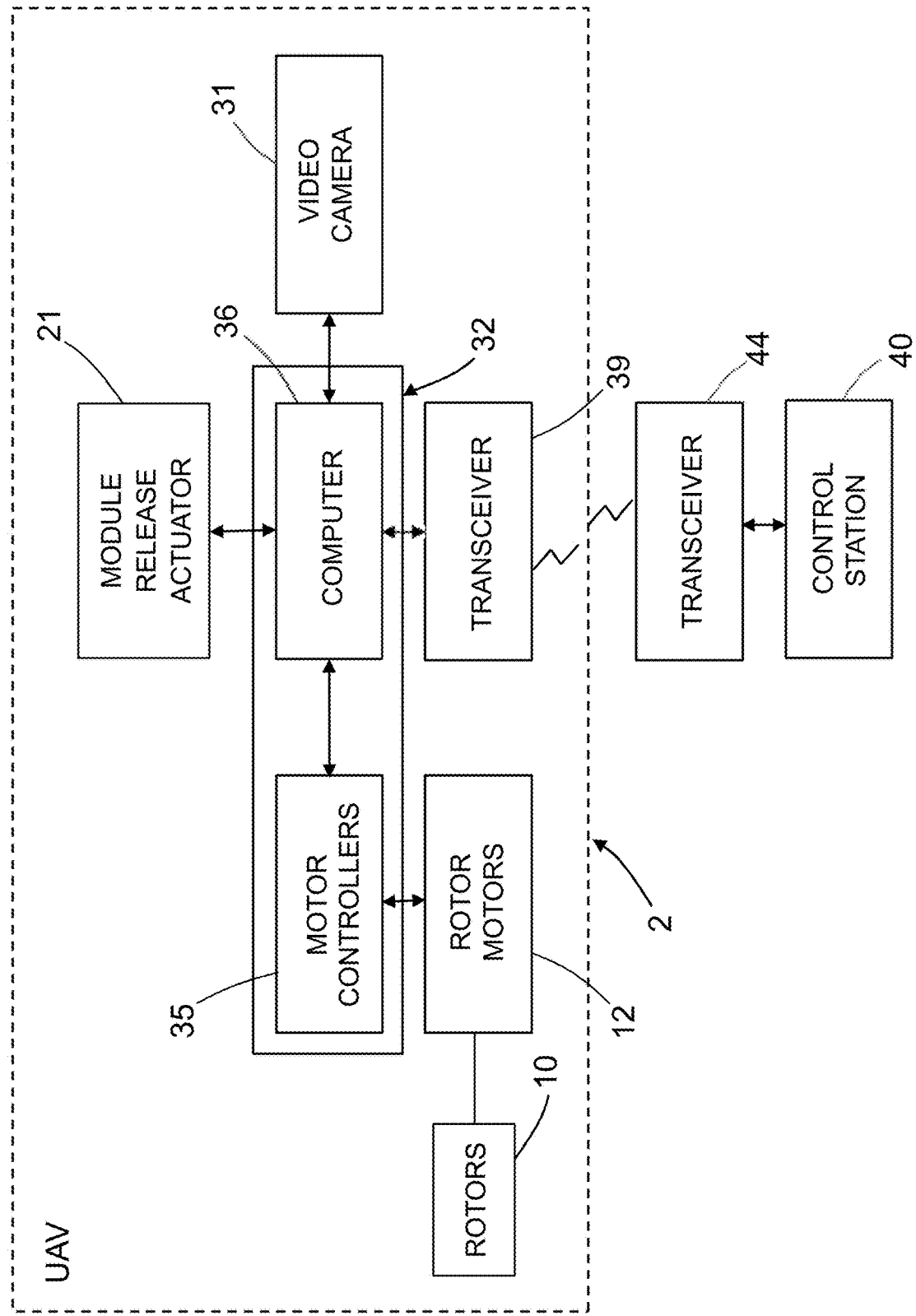
FIG. 18 is a block diagram identifying some components of a remotely controlled UAV configured to carry a module.

FIG. 18 is a block diagram identifying some components of a remotely controlled UAV 2 configured to carry a module (not shown). The flight of the UAV 2 is controlled by a flight controller 32 as previously described with reference to FIG. 9. The UAV 2 includes a video camera 31 that provides images for use in flight control. The UAV 2 is also equipped with a coupling mechanism (such as coupling mechanism 15 depicted in FIG. 10D) which is configured to couple a marking module (not shown in FIG. 18) to the UAV 2 and hold the module securely during flight. The UAV 2 is further equipped with a module release actuator 21 that that actuates the coupling mechanism 15 to de-couple from the marking module. The control station 40 may comprise a general-purpose computer system configured with programming for controlling operations of both the UAV 2 and the marking module.

Figure 19:
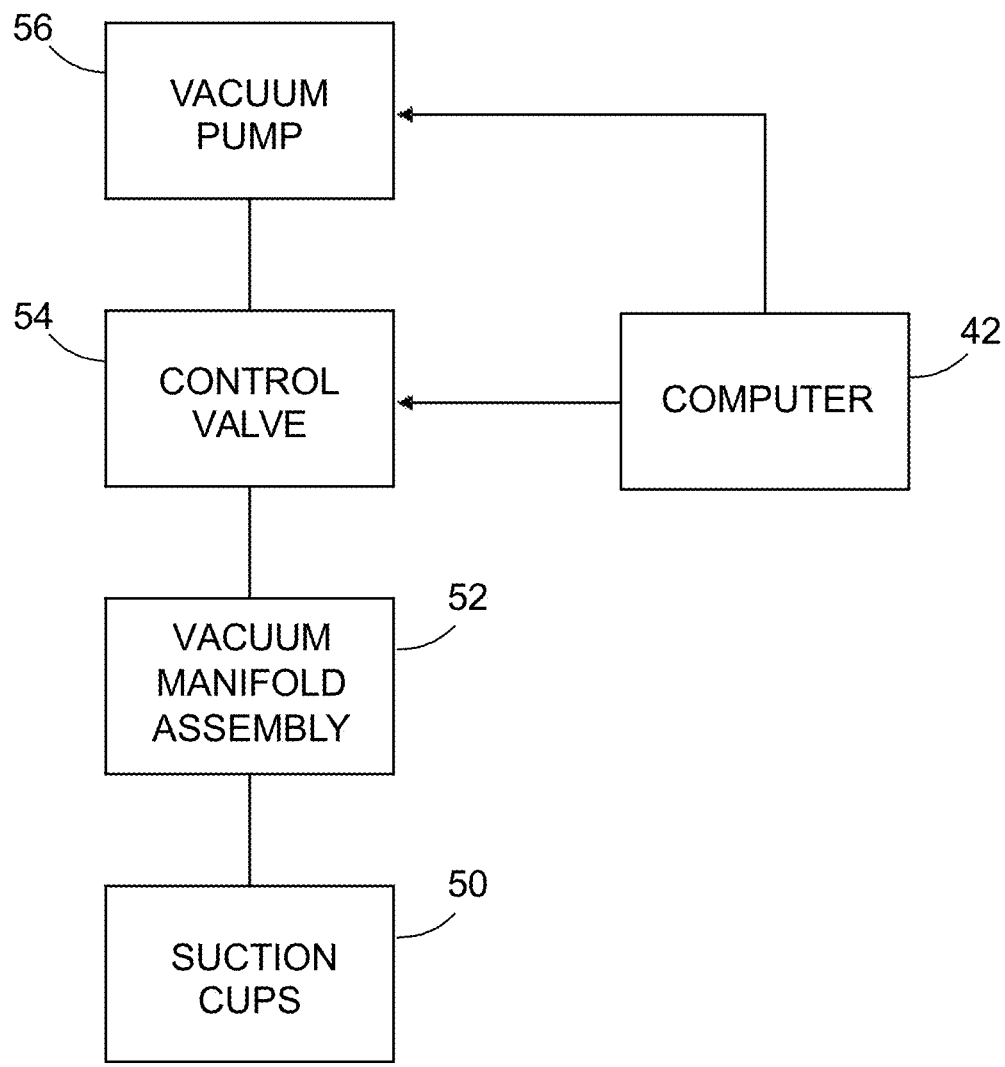
FIG. 19 is a block diagram identifying some components of a system for holding a marking module in a stable position on a surface of a structure using suction cups.

FIG. 19 is a block diagram identifying some components of a system for holding (temporarily attaching) a marking module 25 in a stable position on a surface 9 of a structure using a vacuum adherence system. The vacuum adherence system includes plurality of suction cups 50, a vacuum manifold assembly 52, an electro-mechanical (e.g., solenoid-actuated) control valve 54 (hereinafter "control valve 54"), and a vacuum pump 56. The vacuum pump 56 is in fluid communication with a first port of control valve 54; the vacuum manifold assembly 52 is in fluid communication with a second port of control valve 54. The plurality of suction cups 50 are in fluid communication with the vacuum manifold assembly 52. The term "manifold" is used herein in the sense of a chamber or duct having several outlets through which a fluid can be distributed or gathered. These manifolds connect channels in the suction cups 50 to the vacuum system comprising vacuum pump 56 and control valve 54. In accordance with alternative embodiments, each individual suction cup 50 has a respective vacuum motor (not shown in FIG. 19).

The computer 42 (previously described with reference to FIG. 9) is further configured to control the state of control valve 54, which selectively connects vacuum pump 56 to vacuum manifold assembly 52. The vacuum manifold assembly 52 comprises a plurality of vacuum manifolds which are in fluid communication with respective suction cups 50. The computer 42 may be programmed to send a control signal that causes the control valve 54 to open. In the valve open state, the computer 42 also sends a control signal to activate the vacuum pump 56. The vacuum pump 56 applies a vacuum pressure to the vacuum manifold assembly 52 that causes the suction cups 50 to vacuum adhere to the surface being marked. The vacuum pump 56 needs to maintain constant vacuum pressure. In accordance with one proposed implementation, the vacuum pump 56 does not operate continuously; instead the vacuum pump 56 continuously monitors the vacuum pressure using a sensor, such as a pressure sensor, under the suction cups 50 and activates every time the vacuum pressure falls below a specified threshold. The system will attempt to maintain a pressure differential of about 1 to 2 psi below atmospheric pressure.

Figure 20:
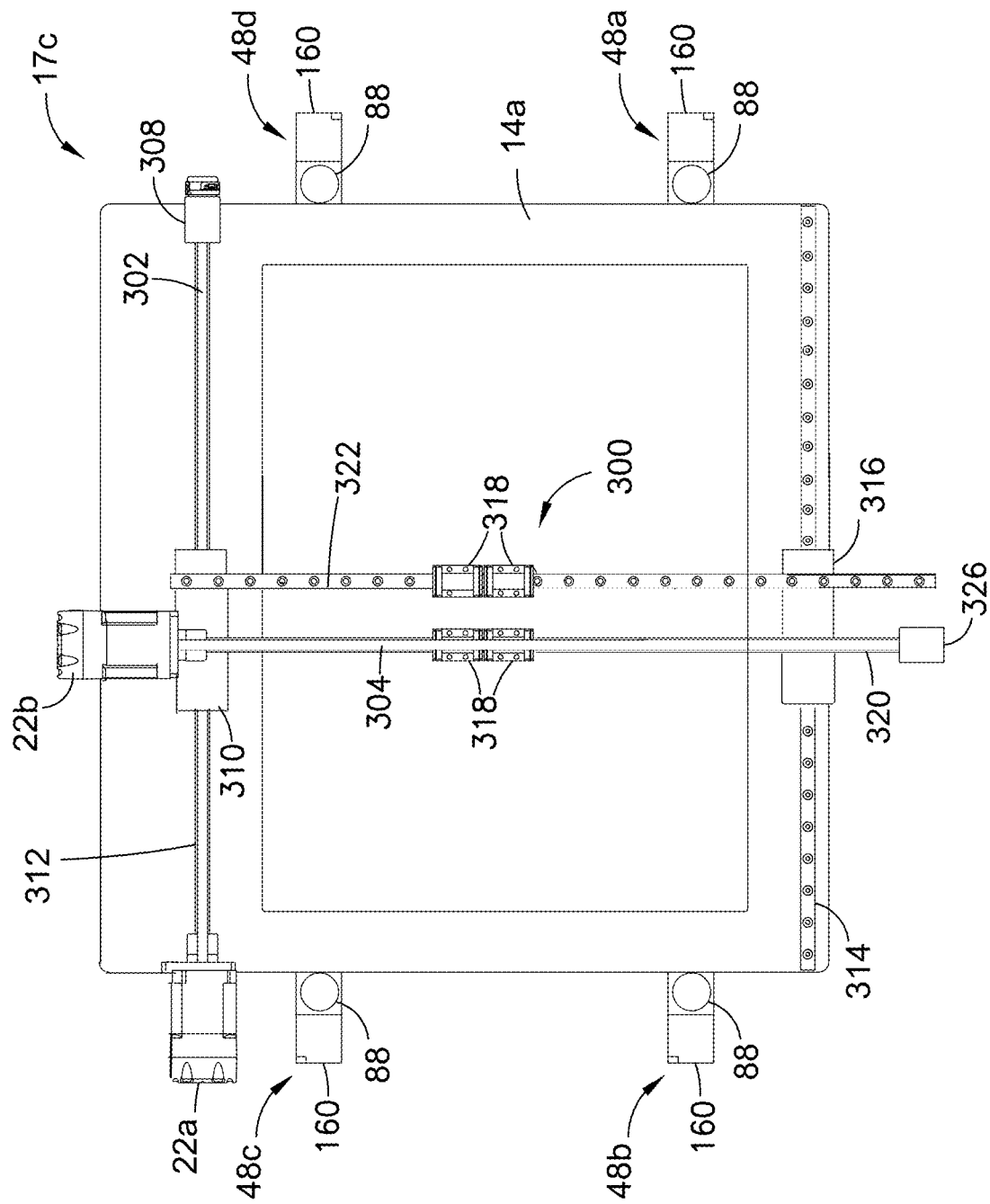
FIG. 20 is a diagram representing a bottom view of an electro-mechanical 2-D plotter (absent the carriage that carries the marking device) in accordance with an alternative embodiment.

FIG. 20 is a diagram representing a bottom view of an electro-mechanical 2-D plotter 17c (absent the carriage that carries the marking device) in accordance with an alternative embodiment. As seen in FIG. 20, the electro-mechanical 2-D plotter 17c includes a traveling bridge 300 that rides on a pair of mutually parallel horizontal linear rails 312 and 314 attached to the front face of open frame structure 76. (The linear rail 312 is partly hidden behind a lead screw 302 in FIG. 20.) The traveling bridge 300 is slidably coupled to the horizontal linear rails 312 and 314 by means of sliders embedded in respective block connectors 310 and 316. The traveling bridge 300 further includes a pair of mutually parallel vertical linear rails 320 and 322 disposed perpendicular to the horizontal linear rails 312 and 314. (The linear rail 320 is partly hidden behind a lead screw 304 in FIG. 20.) The vertical linear rails 320 and 322 are attached to the block connectors 310 and 316 such that all four components move in unison. In addition, a carriage (not shown in FIG. 20) is slidably coupled to the vertical linear rails 320 and 322 by means of sliders 318 (which are shown at middle positions along vertical linear rails 320, 322 in FIG. 20). In accordance with one proposed implementation, the slider/linear rail assemblies are caged-ball linear motion guides of a type which are commercially available from THK Co. Ltd., Tokyo, Japan.

For the purposes of this disclosure, an X-Y-Z coordinate system will be adopted in which the X direction is parallel to the horizontal linear rails 312 and 314, the Y direction is parallel to the vertical linear rails 320 and 322; and the Z direction is perpendicular to the X and Y directions. The carriage is slidably coupled to the vertical linear rails 320, 322 for translation in the Y direction. The traveling bridge 300 is slidably coupled to the horizontal linear rails 312, 314 for translation in the X direction.

The electro-mechanical 2-D plotter 17c depicted in FIG. 20 further comprises a pair of lead screws 302 and 304. The lead screw 302 is threadably coupled to a lead screw nut (not shown in FIG. 20) incorporated inside block connector 310. The lead screw 304 is threadably coupled to a lead screw nut (not shown in FIG. 20) that is fixedly coupled to the carriage. One end of the lead screw 302 is rotatably seated inside a bearing 308 while the other end is connected to the output shaft of an X motion drive motor 22a. Bearing 308 and X motion drive motor 22a are both attached to the base 14a of the module frame. In addition, one end of the lead screw 304 is rotatably seated inside a bearing 326 while the other end is connected to the output shaft of a Y-axis motion motor 324. Bearing 326 and Y-axis motion motor 324 are both components of the traveling bridge 300. The traveling bridge 300 slides along the horizontal linear rails 312, 314 whenever lead screw 302 is rotated. The sliders 318 (and carriage attached thereto) slide along the vertical linear rails 320, 322 whenever lead screw 304 is rotated. The direction of translation depends on the direction of lead screw rotation. Thus, a marking device may be moved across a surface to be marked.

As previously mentioned, the operation of the flying robotic marking platform may be enhanced by the provision of means for stabilizing the module frame relative to the structure or object being marked. The stabilization means employed in the embodiment depicted in FIG. 20 include four pneumatic stabilizers 48a-48d. Each stabilizer comprises a contactor 88 which is preferably made of elastomeric material to provide traction and preclude scratching of the surface of the structure or object when the pneumatic stabilizers 48a-48d are in the extended state.

Figure 21:
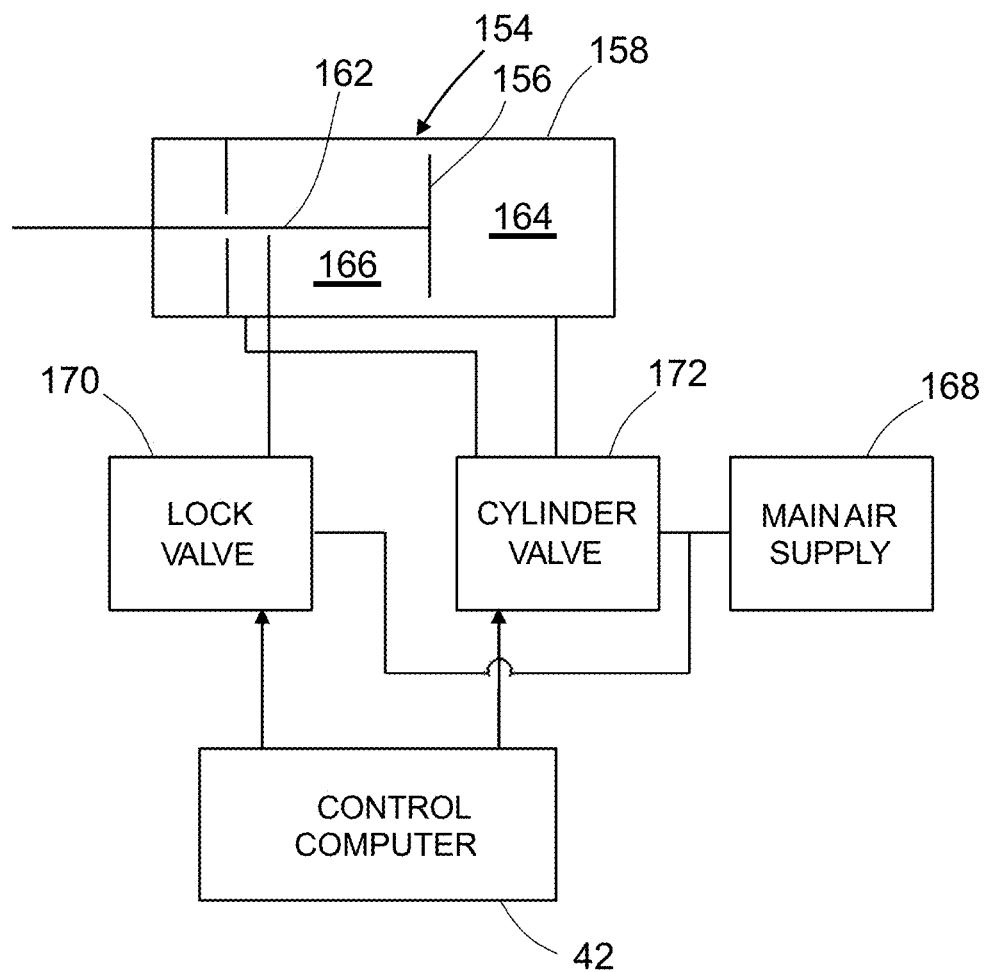
FIG. 21 is a diagram identifying some components of a system for stabilizing a distal end of an extended-reach arm using pneumatic cylinders having rod lock mechanisms.

FIG. 21 is a diagram identifying some components of a system for stabilizing a distal end of an extended-reach arm using pneumatic stabilizers 48a-48d having rod lock mechanisms. As partly shown in FIG. 21, each pneumatic stabilizer 48a-48d is a pneumatic cylinder 154 comprising a base cylinder 158, a piston 156 that is slidable inside the base cylinder 158, and a piston rod 162 connected to the piston 156 and extending outside of the base cylinder 158. The contactor 88 is attached to a distal end of the piston rod 162.

The pneumatic cylinder 154 is operatively coupled to a pressure regulator (not shown in FIG. 21) which is disposed between a main air supply 168 and a cylinder valve 172 (e.g., a solenoid valve 164). The pressure regulator regulates (i.e., reduces) the pressure of the compressed air supplied by the main air supply 168. The pneumatic cylinders 154 are preferably of the double-acting type, meaning that they are capable of moving the piston 156 in either one of opposite directions to produce either an extend stroke or a retract stroke. The state of each cylinder valve 172 is controlled by the computer 42 The computer 42 is configured (programmed) to activate extension of the piston rods 162 in a stabilization mode by opening the cylinder valves 172, thereby causing the contactors 88 to move from their retracted positions to extended positions whereat the contactors 88 all contact the surface to be marked.

The pneumatic stabilizers 48a-48d are compliant at the start of the process in order for all four to make contact the surface with a specific amount of pressure, and they lock in place to keep the assembly from bouncing around while the marking device is being moved on the surface. Each pneumatic stabilizer 48a-48d further comprises a rod lock (not shown in FIG. 21) attached to the base cylinder 158 and configured for locking the piston rod 162 to prevent movement. In accordance with one proposed implementation, the rod lock 160 prevents piston rod movement upon release of stored energy (i.e., the rod lock 160 holds load during power or pressure loss). The rod lock 160 has double-acting locking action for clamping in both directions.

The control computer 42 is configured to cause the pneumatic stabilizers 48a-48d to extend in unison in response to a stabilize command from the system operator or in response to a self-generated stabilize control signal when the marking module is properly located on a surface. The control computer 42 is further configured to cause the rod locks 160 to lock the piston rods 162 in place in response to a lock command from the system operator or in response to a self-generated lock control signal when the contactors all contact the workpiece surface.

Although the control computer 42 controls the states of all of the pneumatic stabilizers 48a-48d, FIG. 21 only shows the components of one pneumatic stabilizer for the sake of simplicity. The double-acting pneumatic cylinder 158 has two ports to allow compressed air into either the internal volume 164 behind the piston 156 (for the extend stroke of the piston rod 162) or the internal volume 166 in front of the piston 156 (for the retract stroke of the piston rod 162). Which internal volume is filled with compressed air from the main air supply 168 is dependent on the state of the cylinder valve 172, which state in turn is controlled by control computer 42. The cylinder valve 172 must be energized during extension and retraction of the piston rod 162. It should also be energized at the end of each stroke until a change of direction is required. The pneumatic system further comprises a lock valve 170 that must be energized (to the retracted state) during piston motion. When the lock valve 170 is not energized, the rod lock 160 is engaged.

Figure 22:
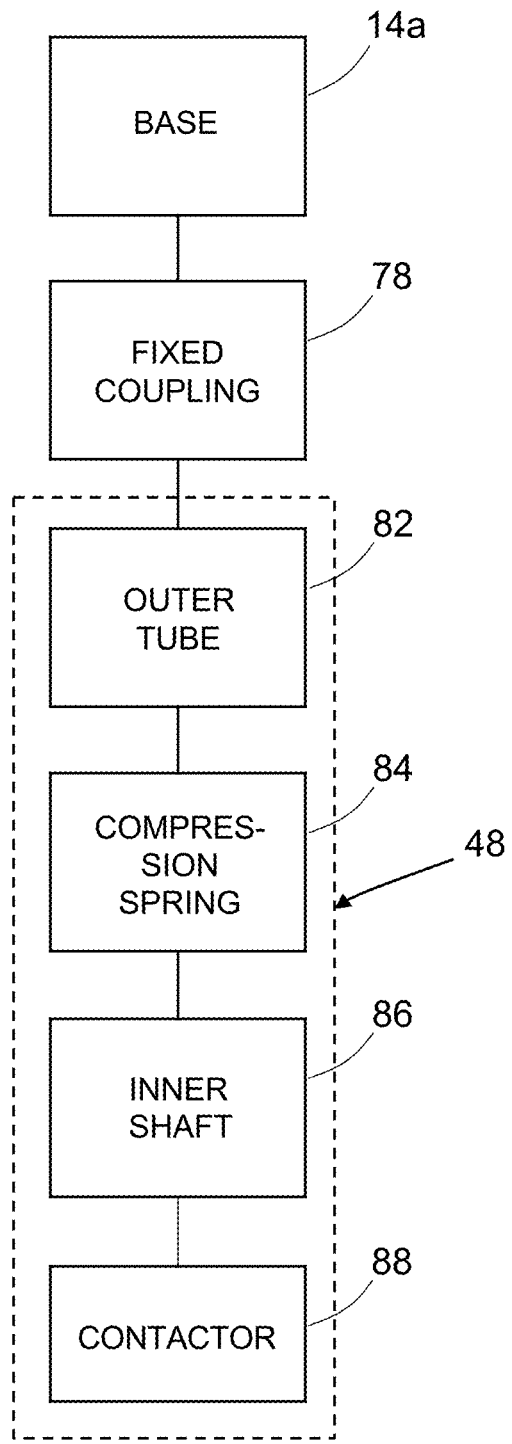
FIG. 22 is a block diagram identifying some components of a stabilizer fixedly coupled to an end effector, which stabilizer comprises telescoped tubes, a spring and a contactor.

FIG. 22 is a block diagram identifying some components of a compliant stabilizer 48 mounted to base 14a of marking module 14 in accordance with an alternative embodiment. In this example, the compliant stabilizer 48 includes an outer tube 82 affixed to base 14a by means of a fixed coupling 78, an inner shaft 86 telescoped inside the outer tube 82, a contactor 88 mounted to a distal end of the inner shaft 86, and a spring 84 that exerts a spring force that urges the inner shaft 86 to extend until the contactor 88 contacts the surface of the workpiece. This type of spring-loaded stabilizer does not require actuation by a control system. It may be useful in some embodiments to have a locking mechanism.

Figure 23:
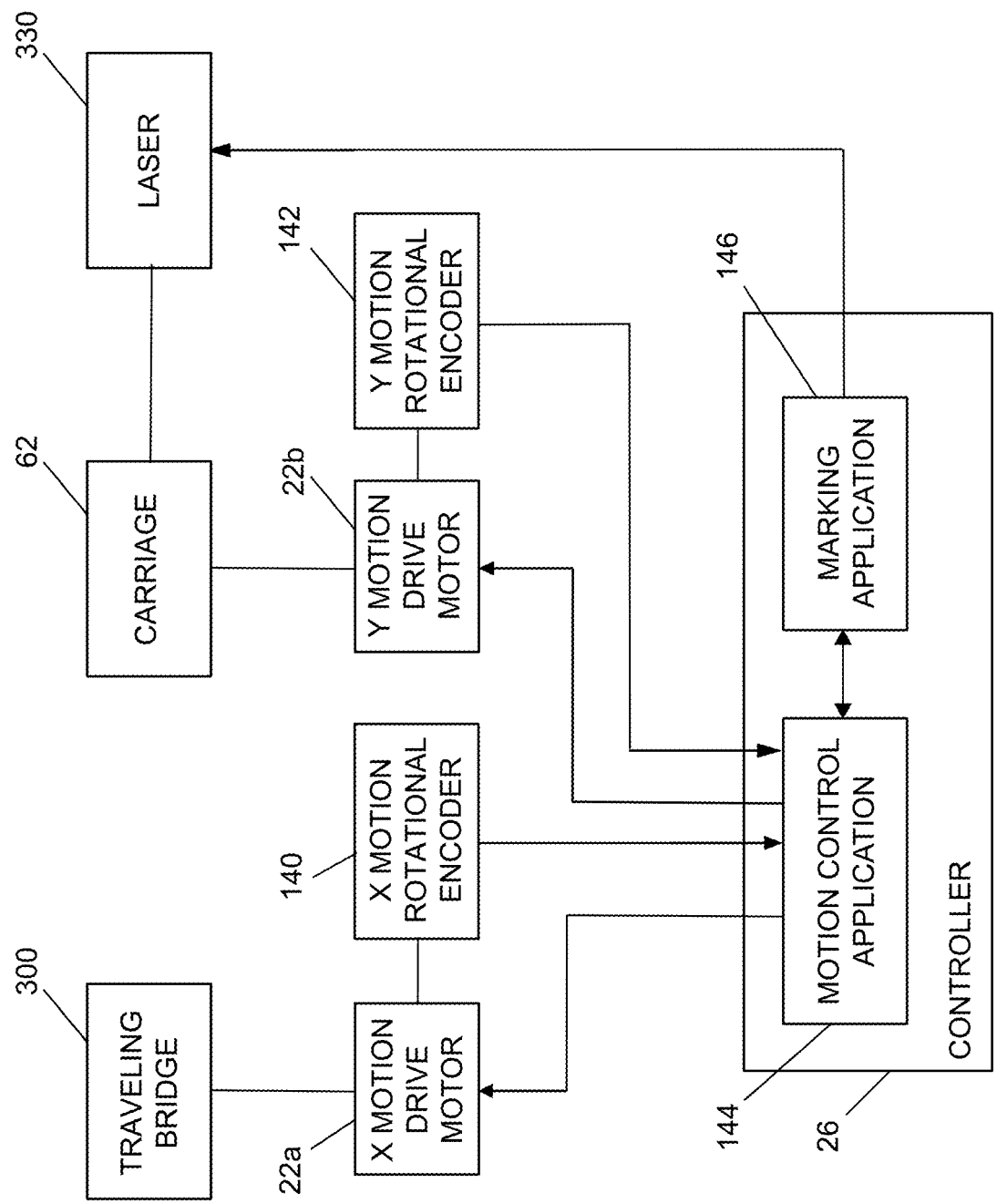
FIG. 23 is a block diagram identifying components of a control system that uses rotation encoders to track the relative location (e.g., relative to an initial location acquired using a local positioning system) of a marking device.

FIG. 23 is a block diagram identifying components of a control system that uses X and Y motion rotational encoders 140 and 142 to incrementally track the relative location (e.g., relative to an initial location acquired using a location measurement system, such as a local positioning system) of a marking device during motion of the marking device over the surface. In this example, the marking device is a laser 330 carried by a carriage 62, which carriage 62 in turn is slidably coupled to a traveling bridge 300 of the type depicted in FIG. 20. The control system comprises a module controller 26 programmed with motion control application software 144 and marking application software 146. The module controller 26 is communicatively coupled to an X motion drive motor 22a (which drives translation of the traveling bridge 300 along the horizontal linear rails 312, 314 seen in FIG. 20) and a Y motion drive motor 22b (which drives translation of carriage 62 along the vertical linear rails 320, 322 of traveling bridge 300). In accordance with one proposed implementation, the X and Y motion drive motors 22a and 22b are stepper motors that do not require feedback from external encoders for motion control. The module controller 26 is programmed with motion control application software 144 comprising respective software modules for controlling the motors. The motion control application 144 controls the operation of X and Y motion drive motors 22a and 22b based on rotation feedback from respective rotational encoders, namely, X-axis rotational encoder 140 and Y-axis rotational encoder 142. The rotational counts from the encoders are converted into linear measurements.

The module controller 26 is connected to the motors and encoders via an electronics box (not shown in FIG. 23). The electronics box contains the system power supplies and integrates all the plotter control connections and provides an interface between the module controller 26 and respective flexible electrical cables that connect to the motors. The encoded data from the X and Y motion rotational encoder 140 and 142 is processed by the module controller 26 to determine the X-Y coordinate position of the laser 330. The module controller 26 hosts marking application software 146 which is configured to control the operation of laser 330 as a function of its X-Y coordinate position in the frame of reference of the structure or object.

One example of markings including intersecting lines and alphanumeric symbology for use in alignment of parts will now be described in some detail for the purpose of illustration. However, it should be appreciated that markings may include geometric symbology (e.g., lines, line segments, dots) applied in any suitable pattern with or without alphanumeric symbology.

Figure 24:
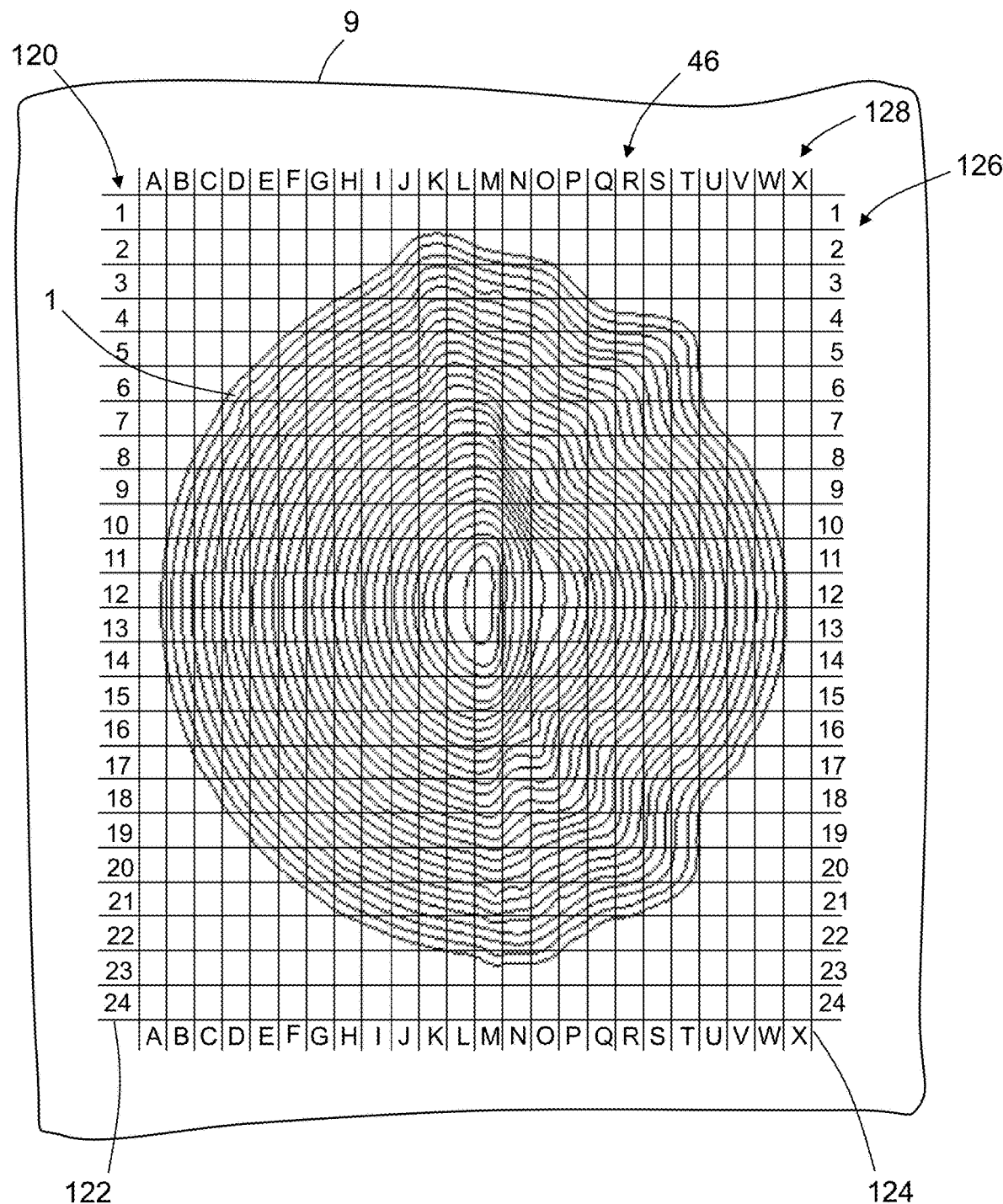
FIG. 24 is a diagram representing a plan view of an anomalous area on a surface having markings arranged to form an alignment pattern overlying an anomaly for use in an alignment task preliminary to repair of the anomalous area.

FIG. 24 is a diagram representing a plan view of an anomalous area on a surface 9 having markings arranged to form an alignment pattern 46 overlying an anomaly 1 for use in an alignment task preliminary to repairing the anomalous area in accordance with one proposed implementation. The alignment pattern 46 includes an orthogonal grid 120 consisting of a network of uniformly spaced horizontal lines 122 and vertical (perpendicular) lines 124 which intersect to form square tilings or cells (hereinafter "cells"). In alternative implementations, the network of lines may be configured to form triangular or hexagonal cells. In addition to the orthogonal grid 120, the alignment pattern 46 includes numeric symbols (numbers) 126 which identify respective rows of square cells and alphabetic symbols (letters) 128 which identify respective columns of square cells.

In general, a numbered grid pattern of the type depicted in FIG. 24 would be used as a way to identify specific locations that can be referenced in the future. For example, if someone examining an image of an anomalous area on a surface noticed a problem and wanted to refer to a specific grid location (e.g., R6), it would be easy for an on-site technician to locate that cell, possibly to perform a repair task or an inspection task, without having to use an additional measurement device, which might introduce a misinterpretation risk (e.g., the measurement performed by the technician might be made in a different way than the analysis intended).

In one example scenario, an analyst/inspector may compare a photograph of a repaired area that includes a uniformly spaced grid to a non-destructive inspection (NDI) scan of the area. More specifically, the analyst/inspector may use the overlay grid markings to match to the coordinates of the NDI scan. An overlay grid is especially useful as a location reference in situations where the photographic image is taken from an angle and may have perspective foreshortening or other optical distortions that make it difficult to accurately acquire dimensions.

In accordance with some embodiments, the marking system proposed herein also includes an off-board tracking system for vehicle and marking device localization, which system may be communicatively coupled to the aforementioned control station 40 on the ground. More specifically, the off-board tracking system is configured to provide three-dimensional (3-D) localization information for navigation and control of the UAV 2 relative to the target object and for accurately locating the marking module in the frame of reference of the target object and correlating the location data with a 3-D model of the target object. Accurate location tracking for UAV-based marking will enable the UAV 2 to move a marking module to the proper location and record the 3-D coordinate data associated with that location. This 3-D information is important for documenting the marking. Any one of various techniques may be used to provide the information necessary to record the 3-D location of the activity. The external localization system may also be used to indicate to the operator the coordinates on the target where marks are needed.

In accordance with one embodiment, the UAV includes an onboard tracking system that is able to navigate the UAV in accordance with a preprogrammed flight plan. The preprogrammed flight plan carried by UAV enables the UAV to follow a flight path around a portion of the target object. The system further includes an off-board tracking system having means for wireless communication with the UAV. The off-board tracking system is configured to send commands to or monitor various operating performance parameters of the UAV, such as fuel remaining, battery power remaining, etc. The off-board tracking system may also be used to generate commands to alter the flight path of the UAV based on acquired localization data.

In accordance with one embodiment, 3-D localization may be accomplished by placing optical targets (such a retro-reflective targets) on the UAV 2 and then using motion capture feedback control to calculate the location of the UAV 2. Closed-loop feedback control using motion capture systems is disclosed in detail in U.S. Pat. No. 7,643,893, the disclosure of which is incorporated by reference herein in its entirety. In accordance with one embodiment, the motion capture system is configured to measure one or more motion characteristics of the UAV 2 during a repair mission. A processor receives the measured motion characteristics from the motion capture system and determines a control signal based on the measured motion characteristics. A position control system receives the control signal and continuously adjusts at least one motion characteristic of the UAV 2 in order to maintain or achieve a desired motion state. The UAV 2 may be equipped with optical targets in the form of passive retro-reflective markers. The motion capture system, the processor, and the position control system comprise a complete closed-loop feedback control system.

In accordance with an alternative embodiment, location tracking of the UAV 2 may be implemented using a local positioning system (not shown in the drawings) mounted on or near the target object. The local positioning system may be controlled from the ground and used to track the location of a UAV 2 having three or more known visible features thereon. A typical local positioning system comprises: a pan-tilt mechanism; a camera mounted to the pan-tilt mechanism; and a laser range meter for projecting a laser beam along an aim direction vector onto each visible features. The pan-tilt mechanism comprises a motorized pan unit and a tilt unit. The camera comprises a housing to which the laser range meter is mounted. The camera may comprise a still camera (color and/or black and white) to obtain still images, a video camera to obtain color and/or black and white video, or an infrared camera to obtain infrared still images or infrared video of the visible features. The local positioning system further comprises a computer system which is configured to measure coordinates of the visible features in the local coordinate system of the target object. In particular, this computer system is programmed to control motions of the pan-tilt mechanism to rotationally adjust the camera to selected angles around the vertical, azimuth (pan) axis and the horizontal, elevation (tilt) axis. The computer system is also programmed to control operation of the camera and receive image data therefrom for transmission to the control station 40. The computer system is further programmed to control operation of the laser range meter and receive range data therefrom for transmission to the control station 40. The local positioning system may further comprise a wireless transceiver and an antenna to enable bidirectional, wireless electromagnetic wave communications with a control station. The local positioning system preferably has the capabilities described in U.S. Pat. Nos. 7,859,655, 9,285,296, and 8,447,805 and U.S. Patent Application Pub. No. 2018/0120196, the disclosures of which are incorporated by reference herein in their entireties. The image data acquired by the video camera of the local positioning system may undergo image processing as disclosed in U.S. Pat. No. 8,744,133.

An alternative 3-D localization approach involves placing two or more UAV-placed visible targets, such as ink marks, adjacent to the repair area. The marks would be used by the UAV to accurately re-orient itself to the repair during each successive repair operation. Automated video localization equipment would be employed to re-orient the UAV to the repair area using the usable marks.

While methods and apparatus for marking of surfaces of UAV-accessible structures and objects have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used in the claims, the term "controller" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit. For example, the term "controller" includes, but is not limited to, a small computer on an integrated circuit containing a processor core, memory and programmable input/output peripherals.

The invention claimed is:

1. An apparatus for marking a target surface of a structure or object, the apparatus comprising:
a first frame;
a plurality of rotor motors mounted to the first frame and capable of producing lift greater than a weight of the apparatus;
a plurality of rotors operatively coupled to respective rotor motors of the plurality of rotor motors;
a first controller programmed to control the rotor motors in a manner that produces lift greater than the weight of the apparatus;
an arm rotatably coupled to the first frame and having a distal end;
a rotating ring mount that rotatably couples the arm to the first frame;
a second frame coupled to the distal end of the arm;
a marking device supported by the second frame.

2. The apparatus as recited in claim 1, further comprising:
a plotter movably coupled to the second frame, the marking device being carried by the plotter; and
a second controller programmed to control the plotter so that the marking device follows a motion path.

3. The apparatus as recited in claim 2, wherein the plotter comprises:
a first traveling bridge slidably coupled to the second frame for translation in an X direction and having a first longitudinal slot; and
a second traveling bridge slidably coupled to the second frame for translation in a Y direction perpendicular to the X direction and having a second longitudinal slot that crosses the first longitudinal slot, and
wherein the marking device is supported at a crossing of the first and second longitudinal slots.

4. The apparatus as recited in claim 3, further comprising:
a first motor operatively coupled to drive translation of the first traveling bridge in the X direction; and
a second motor operatively coupled to drive translation of the second traveling bridge in the Y direction,
wherein the second controller is programmed to control operation of the first and second motors so that the marking device travels along the motion path.

5. The apparatus as recited in claim 2, wherein the plotter comprises:
a traveling bridge slidably coupled to the second frame for translation in an X direction and comprising a guide rail that is perpendicular to the X direction; and
a carriage slidably coupled to the guide rail for translation along the guide rail,
wherein the marking device is carried by the carriage.

6. The apparatus as recited in claim 5, wherein the plotter comprises:
a first motor operatively coupled to drive translation of the traveling bridge in the X direction; and
a second motor operatively coupled to drive translation of the carriage along the guide rail, wherein the second controller is programmed to control operation of the first and second motors so that the marking device travels along the motion path.

7. The apparatus as recited in claim 1, wherein the arm is a telescoping arm.

8. The apparatus as recited in claim 2, wherein the marking device is a laser and the second controller is further configured to control operation of the laser.

9. The apparatus as recited in claim 2, wherein the second frame is releasably coupled to the first frame, further comprising a plurality of surface attachment devices mounted to the second frame.

10. The apparatus as recited in claim 2, wherein the plotter comprises a rotary actuator and an arm coupled to the rotary actuator and having a distal end, wherein the marking device is attached to the distal end of the arm.

11. A method for marking a surface of a structure or object using an unmanned aerial vehicle, the method comprising:
(a) coupling a marking module to the unmanned aerial vehicle, wherein the marking module is coupled to an arm that is rotatably coupled to a frame by a rotating ring mount;
(b) flying the unmanned aerial vehicle to a location in proximity to the surface while carrying the marking module;
(c) placing the marking module into contact with the surface; and
(d) marking the surface using a marking device of the marking module while the marking module is in contact with the surface.

12. The method as recited in claim 11, wherein step (c) comprises moving a contact tip of the marking device along the surface.

13. The method as recited in claim 11, wherein step (c) comprises:
generating a laser beam that impinges on the surface; and
moving the laser beam across the surface,
wherein the laser beam has sufficient energy to melt or vaporize material of the surface at a point of impingement.

14. The method as recited in claim 11, further comprising:
(e) coupling a clean-up module to an unmanned aerial vehicle;
(f) flying the unmanned aerial vehicle to a location in proximity to the surface while carrying the clean-up module;
(g) placing the clean-up module into contact with the surface; and
(h) removing the marking from the surface using a cleaning element of the clean-up module while the clean-up module is in contact with the surface.

15. An unmanned aerial vehicle for marking a target surface of a structure or object, the unmanned aerial vehicle comprising:
a body frame;
a plurality of rotor motors mounted to the body frame and capable of producing lift greater than a weight of the unmanned aerial vehicle;
a plurality of rotors operatively coupled to respective rotor motors of the plurality of rotor motors;
a controller programmed to control the rotor motors in a manner that produces lift greater than the weight of the unmanned aerial vehicle;
an inner ring mounted to the body frame;
an outer ring that is rotatably coupled to the inner ring;
a telescoping arm comprising an outer proximal tube affixed to the outer ring and an inner distal tube that is supported by and displaceable relative to the outer proximal tube;
a second frame pivotably coupled to the inner distal tube;
first and second compliant stabilizers supported by the second frame; and
a first marking device supported by the second frame.

16. The unmanned aerial vehicle as recited in claim 15, further comprising a counterweight which is mounted to the outer ring at an angular position which is diametrically opposed to the telescoping arm.

17. The unmanned aerial vehicle as recited in claim 16, wherein the outer ring, the telescoping arm, and the counterweight are designed to provide a balanced rotational system that allows the telescoping arm to rotate about the center of the inner ring without changing the location of the center-of-mass of the unmanned aerial vehicle.

18. The unmanned aerial vehicle as recited in claim 16, wherein the counterweight comprises:
a platform which is attached to or integrally formed with and extending outward from the outer ring;
an arm pitch control motor mounted to the platform, wherein the arm pitch control motor, when activated, drives rotation of the outer ring relative to the inner ring; and
an electric power system mounted to the platform, wherein the electric power system comprises a battery and associated electronics for providing electric power to the arm pitch control motor.

19. The unmanned aerial vehicle as recited in claim 15, further comprising third and fourth compliant stabilizers supported by the second frame, wherein the first marking device and the first through fourth compliant stabilizers are arranged so that the first through fourth compliant stabilizers contact the target surface before the first marking device contacts the target surface as the second frame approaches the target surface.

20. The unmanned aerial vehicle as recited in claim 19, further comprising second, third, and fourth marking devices, wherein the first through fourth marking devices and first through fourth compliant stabilizers are arranged so that the first through fourth compliant stabilizers contact the target surface before the first through fourth marking devices contact the target surface as the second frame approaches the target surface.

* * * * *